(12) United States Patent
Nagai et al.

(10) Patent No.: US 7,460,198 B2
(45) Date of Patent: Dec. 2, 2008

(54) IPS LCD DEVICE HAVING A WIDER VIEWING ANGLE

(75) Inventors: Hiroshi Nagai, Kanagawa (JP); Hidenori Ikeno, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 494 days.

(21) Appl. No.: 11/007,425

(22) Filed: Dec. 8, 2004

(65) Prior Publication Data
US 2005/0128411 A1    Jun. 16, 2005

(30) Foreign Application Priority Data

Dec. 12, 2003  (JP)  ............... 2003-415183
Dec. 7, 2004   (JP)  ............... 2004-354292

(51) Int. Cl.
*G02F 1/1335*  (2006.01)

(52) U.S. Cl. .................. 349/117; 349/118; 349/96; 349/141

(58) Field of Classification Search .............. 349/117, 349/96, 141, 138, 118, 122
See application file for complete search history.

(56) References Cited

U.S. PATENT DOCUMENTS 6,819,382 B2*  11/2004  Yamaoka et al. ............ 349/117
6,912,029 B2*  6/2005   Tanaka ..................... 349/118
6,927,821 B2   8/2005   Yano et al. ................. 349/117
6,937,308 B2*  8/2005   Ishikawa et al. ........... 349/117
7,075,604 B2   7/2006   Yano et al. ................. 349/117

FOREIGN PATENT DOCUMENTS

| CN | 1374549    | 10/2002 |
|----|------------|---------|
| CN | 1448734    | 10/2003 |
| JP | 10-307291  | 11/1998 |
| JP | 2001-242462| 9/2001  |

* cited by examiner

*Primary Examiner*—Thoi V Duong
(74) *Attorney, Agent, or Firm*—Hayes Soloway P.C.

(57) ABSTRACT

An in-plane-switching-mode (IPS) LCD device includes a TFT substrate and a CF substrate sandwiching therebetween an LC layer, and a pair of polarizing films sandwiching therebetween the substrates and the LC layer. Each polarizing film has a polarization layer and a protective layer An optical compensation layer having a birefringence is disposed between the light-emitting-side polarizing film and the CF substrate. The optical compensation layer has an in-plane retardation of $N_1$ satisfying the following relationship:

$$83.050 - 0.810 \times D_1 \leq N_1 \leq -228.090 - 0.74 D_1$$

in the range of $0 < D_1 \leq 80$ μm, wherein $D_1$ is the thickness of the protective layer of the light-incident-side polarizing film.

6 Claims, 18 Drawing Sheets

//<br>
IPS LCD DEVICE HAVING A WIDER VIEWING ANGLE

BACKGROUND OF THE INVENTION (a) Field of the Invention

The present invention relates to an in-plane-switching-mode liquid crystal display (IPS LCD) device and, more particularly, to the improvement of an IPS LCD device to achieve a wider viewing angle.

(b) Description of the Related Art

An IPS LCD device has the advantage of a wide viewing angle due to the configuration wherein the twisting direction of the liquid crystal (LC) is parallel to the surface of the substrates. The IPS LCD device generally includes an LC layer, a pair of glass substrates sandwiching therebetween the LC layer, and a pair of polarizing films sandwiching therebetween the glass substrates and the LC layer together. In the IPS LCD device, the LC layer is applied with a lateral electric field, which is parallel to the substrates, to control the direction of the LC molecules for image display.

It is known in the IPS LCD device that a chromaticity shift occurs, especially if the LCD device is observed in an angular direction of 45 degrees away from the polarization direction of the polarizing films. The chromaticity shift degrades the image quality of the LCD device. Patent Publication JP-A-10 (1998)-307291 and -2001-242462, for example, describe techniques for suppressing the chromaticity shift in the IPS LCD device.

FIG. 19 shows a portion of the IPS LCD device described in JP-A-10-307291 in a sectional view, wherein a TFT substrate 211 and an associated polarizing film 219 on the TFT-substrate side are depicted, The polarizing film 219 includes a PVA (polyvinyl-alcohol) polarization layer 219C, a pair of triacetyl-cellulose (TAC) protective layers 219B and 219C sandwiching therebetween the PVA polarization layer 219D, and an optical compensation layer 219A disposed between the TAC protective layer 219B and the TFT substrate 211.

The TAC layer 219B has a negative retardation, whereas the optical compensation layer 219A has a positive retardation having a value equivalent to the absolute value of the negative retardation of the TAC layer 219B. It is recited in this publication that the optical compensation layer 219A compensates the retardation generated in the TAC layer 219B, thereby reducing the polarization component caused by the retardation in the TAC layer 219B to suppress the chromaticity shift.

In the structure described in the JP-A-10-307291, however, the polarization of the light incident onto the light-emitting-side polarizing film changes due to the retardation of the LC layer and the light dispersion caused by the color filters. Thus, the suppression of the chromaticity shift by reducing the leakage light in the above configuration is insufficient.

FIG. 20 schematically shows the IPS LCD device described in JP-A-2001-242462 in an exploded perspective view thereof. The LCD device includes two-axial retardation films 302 and 303 each disposed between the LC layer 301 and a corresponding one of the pair of polarizing films 304 and 305. The retardations of the retardation films 302 and 303 are substantially equal to the retardation of the LC layer 301. It is recited in this publication that the retardation films 302 and 303 should be preferably disposed so that the angles between the polarization axis of the light-incident-side polarizing film 304 and the slow axes of the retardation films 302 and 303 assumes zero to 30 degrees.

In JP-A-2001-242462, it is recited that a reversed transmittance phenomenon is suppressed by the configuration. The reversed transmittance is such that the direction of the change in the transmittance of the LC layer is reversed to the direction of the change in the driving voltage. In general, it is known in the IPS LCD device that the reversed transmittance phenomenon is observed in the wavelength range of green or blue when the driving voltage is changed for the LC layer in the range of intermediate gray scale levels. It is also recited in the publication that the chromaticity shift caused by the change of the viewing angle is suppressed by the configuration.

In the LCD device described in JP-A-2001-242462, however, it is not considered there is leakage light caused by the deviation between the polarization axis of the polarizing film 304 and the slow axes of the retardation films 302 and 303, as well as the leakage light caused by the deviation between the polarization axis of the polarizing film 304 and the optical axis of the LC layer 301. In general, the polarization axis of the polarizing film 304 deviates from the slow axes of the retardation films 302 and 303 by an angle of zero to 30 degrees. This deviation generates leakage light upon display of black to degrade the contrast ratio and thus degrade the image quality of the LCD device.

In view of the above problems in the conventional techniques, it is an object of the present invention to provide an IPS LCD device, which is capable of reducing the leakage light leaking upon display of black color as observed in the slanted viewing direction to thereby improve the contrast ratio of the IPS LCD device, and capable of suppressing the chromaticity shift between the normal viewing angle and a slanted viewing angle to thereby improve the image quality of the LCD device.

The present invention provides, in a first aspect thereof, an IPS LCD device including: a liquid crystal (LC) layer having a first optical axis; first and second substrates sandwiching therebetween the LC layer, the first and second substrates being disposed on a light-emitting side and a light-incident side, respectively, of the LCD device; first and second polarizing films sandwiching therebetween the first and second substrates and the LC layer, the first and second polarizing films having polarization axes extending normal to each other and being disposed on the light-emitting side and the light-incident side, respectively, of the LCD device, the second polarizing film including a first protective layer, a polarization layer and a second protective layer, which are disposed consecutively as viewed from the light-incident side, each of the first and second protective layers having a retardation depending on a thickness of the each of the first and second protective layer; and an optical compensation layer disposed between the first polarizing film and the second polarizing film, wherein: the optical compensation layer has a birefringence satisfying the relationship $(ns-nz)/(ns-nf) < \leq 0.5$, where $ns$, $nf$ and $nz$ are a refractive index along an in-plane slow axis, a refractive index along an in-plane fast axis, and a refractive index along a thickness direction, respectively, of the optical compensation layer; an angle between the in-plane slow axis of the optical compensation layer and the first optical axis is within ±2 degrees; and the optical compensation layer has an in-plane retardation $N_1$ (nm), the second optical protective layer has a thickness $D_1$ (μm) satisfying the following relationship:

$$83.050 - 0.810 \times D_1 \leq N_1 \leq 228.090 - 0.74 \times D_1,$$

in a range of $0 < D_1 \leq 80$.

The present invention also provides, in a second aspect thereof, an IPS LCD device including; a liquid crystal (LC) layer having a first optical axis; first and second substrates sandwiching therebetween the LC layer, the first and second substrates being disposed on a light-emitting side and a light-incident side, respectively, of the LCD device; first and second polarizing films sandwiching therebetween the first and second substrates and the LC layer, the first and second polarizing films having polarization axes extending normal to each other and being disposed on the light-emitting side and the light-incident side, respectively, of the LCD device; and first and second optical compensation layers disposed between the first polarizing film and the first substrate and between the second polarizing film and the second substrate, respectively, wherein: each of the first and second optical compensation layers has a birefringence satisfying the relationship (ns−nz)/(ns−nf)≦0.5, where ns, nf and nz are a refractive index along an in-plane slow axis, a refractive index along an in-plane fast axis, and a refractive index along a thickness direction, respectively, of the each of the first and second optical compensation layers; an angle between the in-plane slow axis of the first optical compensation layer and the first optical axis is within ±2 degrees, and an angle between the in-plane slow axis of the second optical compensation layer and the first optical axis is within 90±2 degrees; and the first and second optical compensation layers have in-plane retardations $N_1$ (nm) and $N_2$ (nm), respectively, satisfying the following relationship:

$$29.87+1.79N^2-0.048N_2^2+0.001N_2^3 \leq N_1 \leq 187.22-1.66N_2+0.0475N_2^2-0.0009N_2^3$$

in a range of $0.6 < N_2 \leq 46$.

The present invention also provides, in a third aspect thereof, an IPS LCD device including: a liquid crystal (LC) layer having a first optical axis; first and second substrates sandwiching therebetween the LC layer, the first and second substrates being disposed on a light-emitting side and a light-incident side, respectively, of the LCD device; first and second polarizing films sandwiching therebetween the first and second substrates and the LC layer, the first and second polarizing films having polarization axes extending normal to each other and being disposed on the light-emitting side and the light-incident side, respectively, of the LCD device; and first and second optical compensation layers disposed between the first polarizing film and the first substrate and between the second polarizing film and the second substrate, respectively, wherein: each of the first and second optical compensation layers has a birefringence satisfying the relationship (ns−nz)/(ns−nf)≦0.5, where ns, nf and nz are a refractive index along an in-plane slow axis, a refractive index along an in-plane fast axis, and a refractive index along a thickness direction, respectively, of the each of the first and second optical compensation layers; an angle between the in-plane slow axis of each of the first and second optical compensation layers and the first optical axis is within ±2 degrees; and the first and second optical compensation layers have in-plane retardations $N_1$ (nm) and $N_2$ (nm), respectively, satisfying the following relationship:

$$162.560-8.874N^2+2.258N_2^2-0.291N_2^3+0.0165N_2^4-0.000346N_2^5 \leq N_1 \leq 142.465+2.546N_2-0.017N_2^2$$

in a range of $0.6 \leq N_2 \leq 22$;

$$73.04-0.977N^2+0.0220N_2^2 \leq N_1 \leq 142.465+2.546N_2-0.017N_2^2$$

in a range of $22 < N_2 \leq 62$; and $$73.04-0.977N^2+0.00220N_2^2 \leq N_1 \leq 1205.596-41.304N_2+0.586N_2^2-\mathbf{0.0028N_2^3}$$

in a range of $62 < N_2 \leq 92$:

The present invention also provides, in a fourth aspect thereof, an IPS LCD device including: a liquid crystal (LC) layer having a first optical axis; first and second substrates sandwiching therebetween the LC layer, the first and second substrates being disposed on a light-emitting side and a light-incident side, respectively, of the LCD device; first and second polarizing films sandwiching therebetween the first and second substrates and the LC layer, the first and second polarizing films having polarization axes extending normal to each other and being disposed on the light-emitting side and the light-incident side, respectively, of the LCD device; and first and second optical compensation layers disposed between the first polarizing film and the first substrate and between the second polarizing film and the second substrate, respectively, wherein: the first optical compensation layer has a birefringence satisfying the relationship $(ns_1-nz_1)/(ns_1-nf_1) \leq 0.5$, where $ns_1$, $nf_1$, $nz_1$ are a refractive index along an in-plane slow axis, a refractive index along an in-plane fast axis, and a refractive index along a thickness direction, respectively, of the first optical compensation layer; the second optical compensation layer has a birefringence satisfying the relationship $(ns_2-nz_2)/(ns_2-nf_2) \leq -2$, where $ns_2$, $nf_2$, $nz_2$ are a refractive index along an in-plane slow axis, a refractive index along an in-plane fast axis, and a refractive index along a thickness direction, respectively, of the second optical compensation layer; an angle between the in-plane slow axis of the first optical compensation layer and the first optical axis is within ±2 degrees, and the second optical compensation layer has an optical axis substantially normal to a surface of second substrate; and the first and second optical compensation layers have in-plane retardations $N_1$ (nm) and $N_2$ (nm), respectively, satisfying the following relationship;

$$36.859+7.617N_2 \leq N_1 \leq 168.193+9.783N_2$$

in a range of $0 < N_2 \leq 6.0$.

The present invention also provides, in a fifth aspect thereof, an IPS LCD device including: a liquid crystal (LC) layer having a first optical axis; first and second substrates sandwiching therebetween the LC layer, the first and second substrates being disposed on a light-emitting side and a light-incident side, respectively, of the LCD device; first and second polarizing films sandwiching therebetween the first and second substrates and the LC layer, the first and second polarizing films having polarization axes extending normal to each other and being disposed on the light-emitting side and the light-incident side, respectively, of the LCD device, each of the first and second polarizing films including a first protective layer, a polarization layer and a second protective layer, which are disposed consecutively as viewed from the light-incident side, each of the first and second protective layers having a retardation in a thickness direction thereof; and an optical compensation layer disposed between the first polarizing film and the first substrate, wherein: the optical compensation layer has a birefringence satisfying the relationship $0.0 \leq (ns-nz)/(ns-nf) \leq 0.5$, where ns, nf and nz are a refractive index along an in-plane slow axis, a refractive index along an in-plane fast axis, and a refractive index along a thickness direction, respectively, of the optical compensation layer; an angle between the in-plane slow axis of the optical compensation layer and the first optical axis is within ±2 degrees; and the optical compensation layer has an in-plane retardation $N_1$ (nm), and the second protective layer of the second polarizing film has a retardation $R_{t2}$:

$$R_{t2} = \left(\frac{npx_2 + npy_2}{2} - npz_2\right) \times d_2$$

in the thickness direction thereof, where $npx_2$, $npy_2$, $npz_2$ and $d_2$ are a refractive index along an in-plane slow axis, a refractive index along an in-plane fast axis, a refractive index along an orthogonal axis and a thickness, respectively, of the second protective layer of the second polarizing film; and the $N_1$ and $R_{t2}$ satisfy therebetween the following relationship:

83.050−1.18$R_{t2}$≦$N_1$≦228.090−1.08$R_{t2}$.

in a range of 0≦$R_{t2}$≦55 nm.

The present invention also provides, in a sixth aspect thereof, a polarizing film pair for use in a liquid crystal display (LCD) device, including: a first polarizing film including a first protective layer, a first polarization layer having a first absorption axis, a first retardation film having an optical axis normal to a surface of the first polarization layer, the first retardation film having a negative-single-axis birefringence having an in-plane retardation in a range of 0 to 15 nm and an orthogonal retardation of 50 to 123 nm, and a second retardation film having an optical axis parallel to the surface of the polarization layer and the first absorption axis, the second retardation film having a negative uniaxial birefringence having an in-plane retardation of 83 to 210 nm, the second retardation film having different refractive indexes (no) and (ne) along in-plane optical axes extending parallel to each other, and a refractive index (nz) along a direction normal to the surface of the polarization layer, the refractive indexes satisfying the relationship no=nz>ne, the first protective layer, the first polarization layer, the first retardation film and the second retardation film being consecutively layered; and a second polarizing film including a second protective layer, a second polarization layer having a second absorption axis, and a third retardation film having a birefringence having an in-plane retardation of 0 to 10 nm and an orthogonal retardation of 0 to 35 nm, the second protective layer, the second polarization layer and the third retardation layer being consecutively layered.

The present invention also provides, in a seventh aspect thereof, an LCD device including a liquid crystal (LC) layer having a homogeneous orientation, a pair of substrates sandwiching therebetween the LC layer, the polarizing film pair of the present invention sandwiching therebetween the substrates and the LC layer.

In accordance with the IPS LCD device of the present invention, the leakage light leaking upon display of black in the slanted viewing direction can be reduced to improve the contrast ratio of the LCD device, and the chromaticity shift between the normal viewing direction and a slanted viewing direction can be suppressed to thereby improve the image quality of the IPS LCD device.

The above and other objects, features and advantages of the present invention will be more apparent from the following description, referring to the accompanying drawings.

PREFERRED EMBODIMENT OF THE INVENTION

Figure 1:
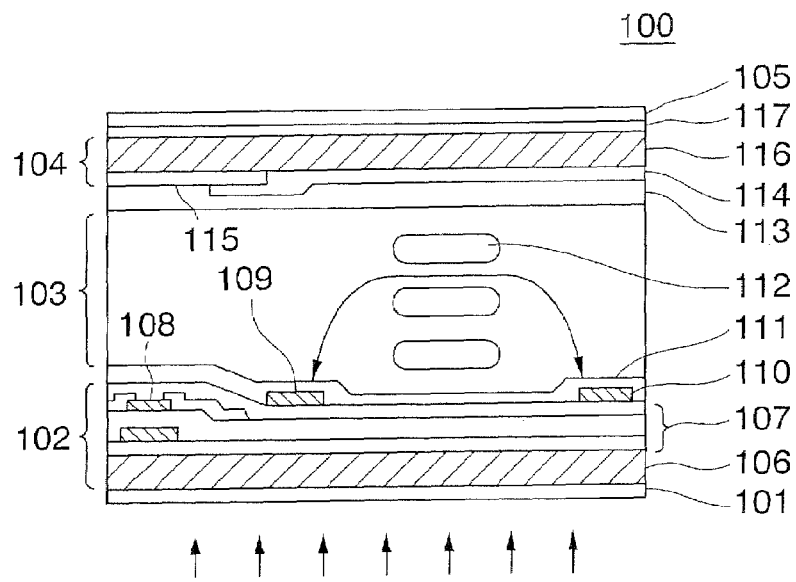
FIG. 1 is a sectional view of an IPS LCD device according to a first embodiment of the present invention.

Now, the present invention is more specifically described with reference to accompanying drawings, wherein similar constituent elements are designated by similar reference numerals throughout the drawings.

Referring to FIG. 1, an IPS LCD device, generally designated by numeral 100, according to a first embodiment of the present invention includes a light-incident-side polarizing film 101, a TFT (thin-film-transistor) substrate 102, an LC layer 103, a CF (color-filter) substrate 104, and a light-emitting-side polarizing film 105, which are consecutively arranged as viewed along the travelling direction of the backlight. An orientation film 111 is interposed between the LC layer 103 and the TFT substrate 102, and another orientation film 113 is interposed between the LC layer 103 and the CF substrate 104. An optical compensation layer 117 having a specific optical characteristic is interposed between the CF substrate 104 and the light-emitting-side polarizing film 105. The optical compensation layer 117 may be provided by bonding or coating, for example.

The TFT substrate 102 includes a glass substrate body 106, insulation films 107, and a plurality of pixels each including a TFT 108, a pixel electrode 109 and a portion of a counter electrode 110. Each TFT 108 controls the potential of a corresponding pixel electrode 109. The pixel electrode 109 and a corresponding portion of the counter electrode 110 apply therebetween a lateral electric field onto the LC molecules 112 in the LC layer 103. The insulation films 107 include an organic film and a silicon nitride film. The CF substrate 104 includes color filters 114, a shield film pattern 115 and a glass substrate body 116, The color filters 114 add three primary colors to the light passed by the LC layer 103. The shield film pattern 115 shields TFT 108, data lines etc. against the light.

Figure 2A:
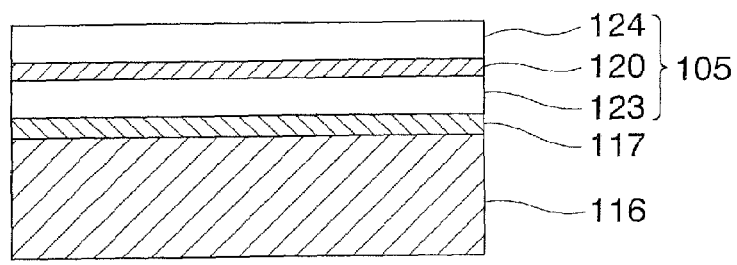
FIGS. 2A and 2B are enlarged partial sectional views of the IPS LCD device of FIG. 1.
Figure 2B:
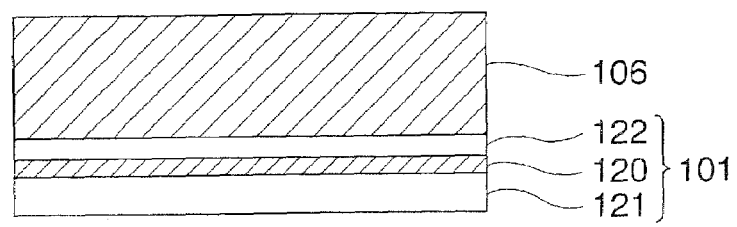

FIG. 2A shows the detail of a portion of the LCD device 100 of FIG. 1, including the light-emitting-side polarizing film 105, the optical compensation layer 117 and the glass substrate body 116 of the CF substrate 104. FIG. 2B shows the detail of another portion of the LCD device of FIG. 1, including the light-incident-side polarizing film 101 and the glass substrate body 106 of the TFT substrate 102.

The light-incident-side polarizing film 101 includes, as shown in FIG. 2B, a polarization layer 120 made of PVA, for example, and first and second protective layers 121 and 122 made of TAC, for example, and sandwiching therebetween the polarization layer 120. The light-emitting-side polarizing film 105 includes, as shown in FIG. 2A, a polarization layer 120 and third and fourth protective layers 123 and 124 sandwiching therebetween the polarization layer 120. Each protective layer 121, 122, 123 or 124 acts as a retardation layer having a negative single optical axis, and has a retardation depending on the thickness of the each protective layer.

The inventors conducted simulations on the IPS LCD device 100 having the above structure, to obtain the suitable conditions as to the optical characteristics of the optical compensation layer 117 including the retardation thereof, and the optical characteristics of the second protective layer 122 of the light-incident-side polarizing film 101. The suitable conditions as used herein are such that the leakage light and the chromaticity shift are reduced to satisfactory levels when viewing the LCD device in the slanted viewing direction. The satisfactory level for the leakage light is such that a general observer does not perceive the leakage light as a disturbing phenomenon, whereas the satisfactory level for the chromaticity shift is such that the chromaticity shift is not increased compared to a general IPS LCD device including no optical compensation layer such as 117.

In the simulations, parameters of the components other than the optical compensation layer 117 and the second protective layer 122 of the light-incident-side polarizing film 101 are fixed as tabulated in Table 1.

TABLE 1

| | thickness (μm) | refractive index (or birefringence) | optical axis (φ, θ) |
|---|---|---|---|
| fourth protective layer 124 | 80 | (0.0015) | (0, 90) |
| polarization layer 120 | — | — | (90, 0) |
| third protective layer 123 | 80 | (0.0015) | (0, 90) |
| glass substrate body 116 | — | 1.54 | — |
| CF substrate 114 | — | 1.5 | — |
| LC layer 103 | — | Δnd = 300 ± 80 nm | — |
| insulation (organic) layer 107 | — | 1.5 | — |
| insulation (SiNx) layer 107 | — | 1.9 | — |
| insulation (SiO$_2$) layer 107 | — | 1.48 | — |
| glass substrate body 106 | — | 1.54 | — |
| polarization layer 120 | — | — | (0, 0) |
| first protective layer 121 | 80 | (0.0015) | (0, 90) |

Figure 3:
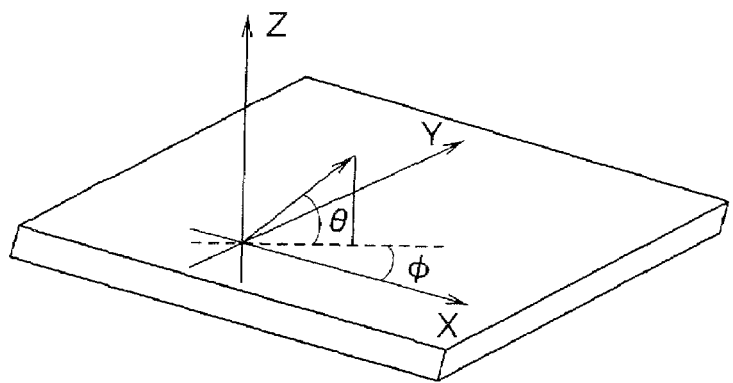
FIG. 3 is a perspective view of the LCD device, shown for defining the azimuth angle φ and the viewing angle θ of the LCD device.

In the notation of Table 1, as shown in FIG. 3, the optical axis is represented in the XYZ-coordinate system by an azimuth angle φ and an inclined angle θ, wherein X-axis and Y-axis are parallel to the polarization axes of the polarizing films. The azimuth angle φ of an arbitrary vector is represented by an angle between the X-axis and the arbitrary vector projected onto the X-Y plane, and the inclined angle is represented by the angle between the arbitrary vector and the X-Y plane.

An experiment was conducted in an IPS LCD device prior to the simulations to obtain a brightness level of the backlight at which the leakage light in the slanted viewing direction does not substantially degrade the image quality, after gradually reducing the brightness level of the backlight. The experiment revealed that a half of the maximum brightness level generally used for the image display allowed the leakage light not to significantly affect the image quality in the slanted viewing direction, and a quarter of the maximum brightness level allowed the leakage light not to be perceived by the observer. In view of these results, half of the leakage light of a typical IPS LCD device in the slanted viewing direction is used as a reference leakage level, at which a suitable image quality is achieved. The slanted viewing direction is set at an azimuth angle, which is 45 degrees away from the polarization axis of the polarizing film.

Figure 4:
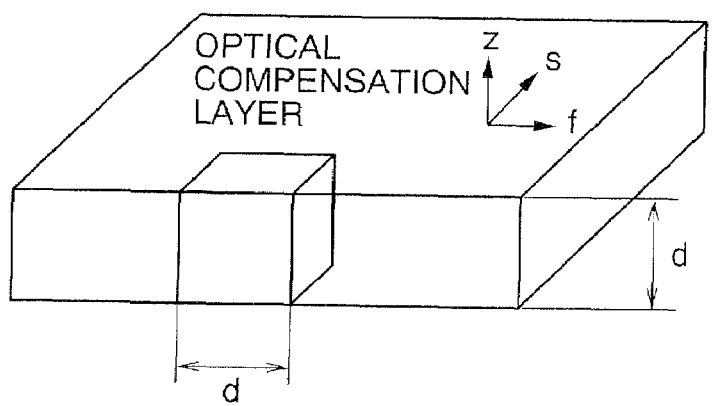
FIG. 4 is a perspective view of an optical compensation layer, shown for defining the retardation thereof.

As to the retardation of the optical compensation layer, as shown in FIG. 4, the in-plane retardation is defined herein by (ns−nf)d and the orthogonal retardation (Δnd), i.e., retardation in the thickness direction, is herein defined by:

$$\left(\frac{nf + ns}{2} - nz\right) \times d$$

where ns, nf and nz are the refractive index along the in-plane slow axis, the refractive index along the in-plane fast axis and the refractive index in the thickness direction, and where d is the equivalent thickness of the optical compensation layer. In the simulations, an optical compensation layer 117 having an optical characteristic of (ns−nz)/(ns−nf)≦0.5 was employed, whereas a second protective layer 122 having an optical characteristic of (ns−nz)/(ns−nz)≧6 was employed. The optical axis of the second protective layer 122 was directed to (φ, θ)=(0,90). The angle between the slow axis of the optical compensation layer 117 and the optical axis of the LC layer 103 is preferably set within ±2 degrees, and more preferably set at zero degree.

Figure 5:
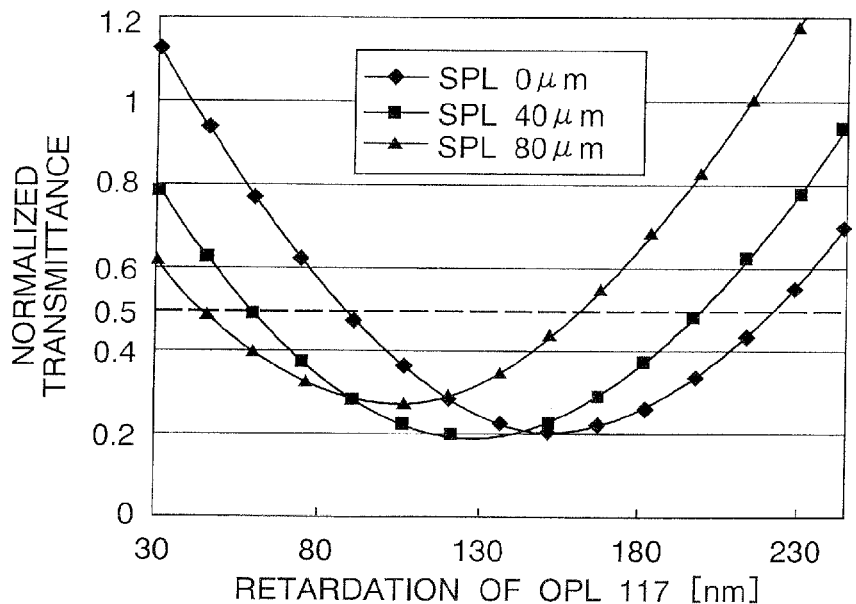
FIG. 5 is graph showing the relationship between the in-plane retardation of the optical compensation layer and the transmittance in the slanted viewing direction.

FIG. 5 shows the relationship between the in-plane retardation of the optical compensation layer (OPL) 117 and the normalized transmittance of the LCD device of the present embodiment in the slanted viewing direction, plotted for different length of the second protective layer (SPL) 122. The transmittance shown in the graph is evaluated in an azimuth angle of 45 degrees and in a viewing angle of 70 degrees upon display of black, and is normalized by the transmission of a conventional LCD device obtained in the same conditions. The conventional LCD device is similar to the LCD device of the present embodiment except that the conventional LCD device has therein no optical compensation layer.

A satisfactory level of the leakage light upon display of black can be obtained if the normalized transmittance is 0.5 or lower, as described before. From FIG. 5, the normalized transmittance of 0.5 or lower can be obtained, if the thickness of the second protective layer 122 is within the range of 0 to 80 μm, and the retardation of the optical compensation layer 117 is within the range of 45 to 225 nm. More specifically, a suitable combination of this range of the thickness of the second protective layer 122 and this range of the retardation of the optical compensation layer 117 provides the satisfactory level of the leakage light upon display of black. The range of thickness, 0 to 80 μm, of the second protective layer 122 corresponds to an in-plane retardation of 0 to 6.0 nm of the second protective layer 122, and a retardation (orthogonal retardation) of 0 to 55 nm in the thickness direction thereof.

Figure 6:
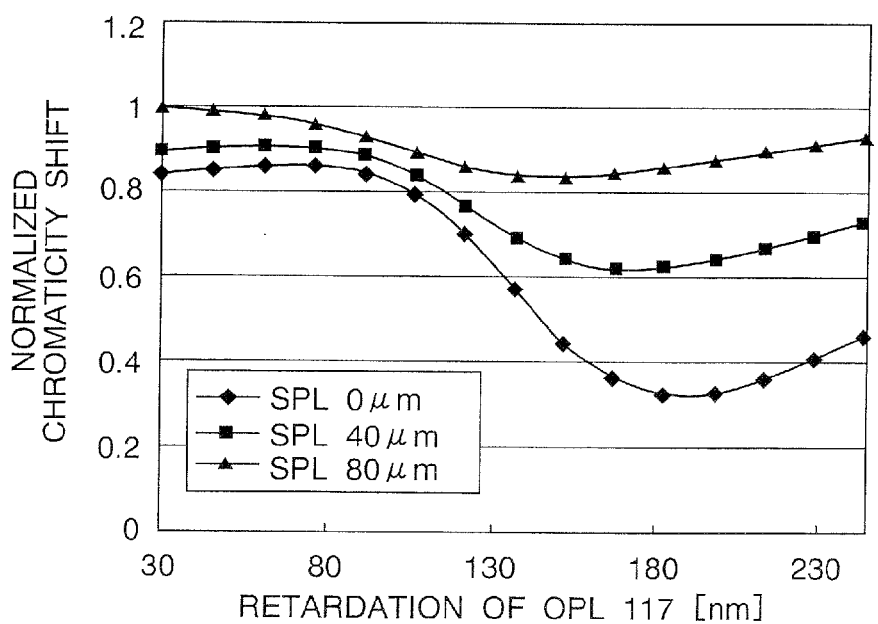
FIG. 6 is a graph showing the relationship between the in-plane retardation of the optical compensation layer and the chromaticity shift in the slanted viewing direction.

FIG. 6 shows the relationship between the in-plane retardation of the optical compensation layer (OPL) 117 and the chromaticity shift for different thicknesses of the SPL 122. The chromaticity shift is normalized by the chromaticity shift measured in the conventional LCD device having therein no optical compensation layer. The chromaticity shift is defined in a chromaticity coordinate system using the chromaticity, (u',v')=(u$_0$',v$_0$'), as observed in the normal viewing direction where (φ,θ)=(0, 0), and the chromaticity, (u', v')=(u$_1$', v$_1$'), as observed in the slanted viewing direction where (φ, θ)=(45, 70), as follows:

$$\Delta u'v' = \sqrt{(u_1' - u_0')^2 + (v_1' - v_0')^2}.$$

In short, the chromaticity shift represents a difference between the color observed in the normal direction (direction normal to the screen) and the color observed in the slanted direction. The definition of the chromaticity shift appears in "1976 CIE Chromaticity Diagram".

In FIG. 6, assuming that the second protective layer 122 has a thickness between 0 μm and 80 μm, the normalized chromaticity shift remains "1" or lower if the retardation of the optical compensation layer 117 is within a range between 30 nm and 230 m nm, thereby achieving an effective superior suppression of the chromaticity shift. It will be also understood that, if a configuration, wherein the second protective layer 122 has a thickness between 0 μm and 40 μm and the retardation of the optical compensation layer 117 is 130 nm or above, is employed, a more superior suppression of the chromaticity shift can be obtained.

Figure 7:
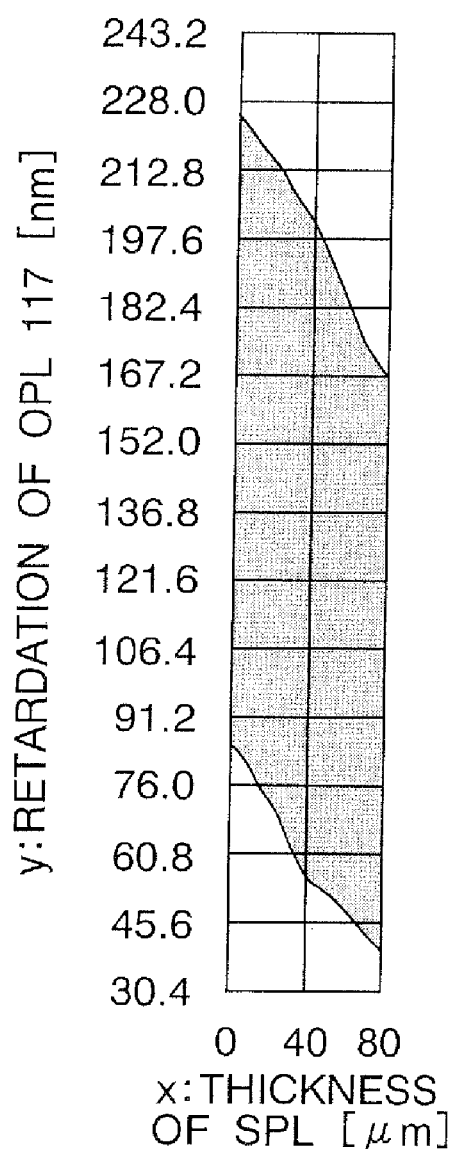
FIG. 7 is a graph showing a range of superior combinations of the retardation of the optical compensation layer and the thickness of the protective layer.

A combination of the thickness of the second protective layer 122 and the retardation of the optical compensation layer 117, which achieves a satisfactory level of the leakage light in the slanted viewing direction, can be obtained from FIGS. 5 and 6. The resultant combination is shown in FIG. 7, wherein the superior combination of the retardation of the OPL 117 and the thickness of the second protective layer (SPL) 122 is represented by the dark area. The dark area can be expressed by the formula using approximating linear equations for the upper and lower limits of the dark area, as follows:

$$83.050 - 0.810x \leq y \leq 22.8090 - 0.74x, \text{ and}$$

$$0 < x \leq 80,$$

where x and y represent the thickness of the second protective layer 122 and the retardation of the optical compensation layer 117.

In the present embodiment, the combination expressed by the above formula and represented by the dark area in FIG. 6 provides a satisfactory level for the leakage light in the slanted direction and a superior suppression of the chromaticity shift. This is considered because the optical dispersions generated in the second protective layer 122 of the polarizing film 101 on the light-incident side, LC layer is 103 and CF substrate 104 can be suppressed by the optical compensation layer 117, thereby achieving a less-dispersed state of light on the surface of the polarization layer 120 of the polarizing film 105 on the light-emission side.

Figure 8A:
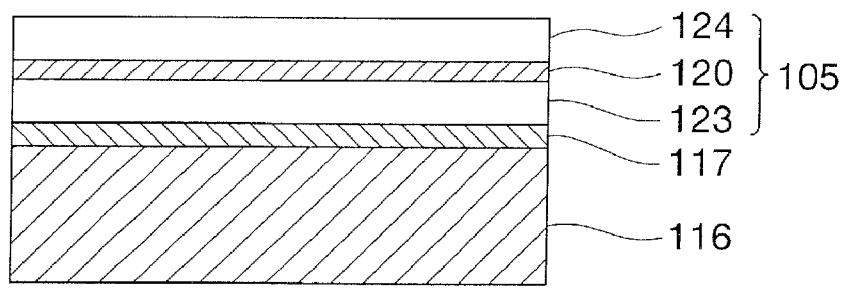
FIGS. 8A and 8B are partial sectional views of an IPS LCD device according to a second embodiment of the present invention.
Figure 8B:
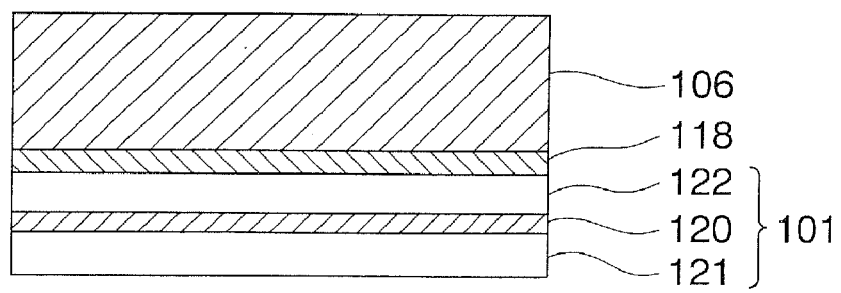

FIGS. 8A and 8B show, similarly to FIGS. 2A and 2B, partial sectional views of an LCD device according to a second embodiment of the present invention. The LCD device of the present embodiment includes another optical compensation layer 118 between the optical compensation film 101 and the glass substrate body 106 in addition to the configuration of the LCD device of the first embodiment.

Simulations were conducted for the LCD device of Fig. to obtain the conditions for achieving a satisfactory level for the leakage light in the slanted viewing direction, and a satisfactory level for the chromaticity shift compared to the conventional IPS LCD device having no optical compensation layer 117 or 118. In these simulations, the following values for the parameters of the other components were used.

TABLE 2

| | thickness (μm) | refractive index (or birefringence) | optical axis (φ, θ) |
|---|---|---|---|
| fourth protective layer 124 | 80 | (0.0015) | (0, 90) |
| polarization layer 120 | — | — | (90, 0) |
| third protective layer 123 | 80 | (0.0015) | (0, 90) |
| glass substrate body 116 | 700 | 1.54 | — |
| CF substrate 114 | 0.1 | 1.5 | — |
| LC layer 103 | | Δnd = 300 ± 80 nm | |
| insulation (organic) layer 107 | — | 1.5 | — |
| insulation (SiNx) layer 107 | — | 1.9 | — |
| insulation (SiO$_2$) layer 107 | — | 1.48 | — |
| glass substrate body 106 | — | 1.54 | — |
| second protective layer 122 | 80 | (0.0015) | (0, 90) |
| optical compensation layer120 | — | — | (0, 0) |
| first protective layer 121 | 80 | (0.0015) | (0, 90) |

In the simulations, the optical compensation layers 117 and 118 had an optical characteristic wherein:

$$(ns-nz)/(ns-nf) \leq 0.5.$$

The angle between the slow axis of the optical compensation layer 117 on the CF-substrate side and the optical axis of the LC layer 103 should be set within ±2 degrees, and preferably set at zero degree.

Figure 9:
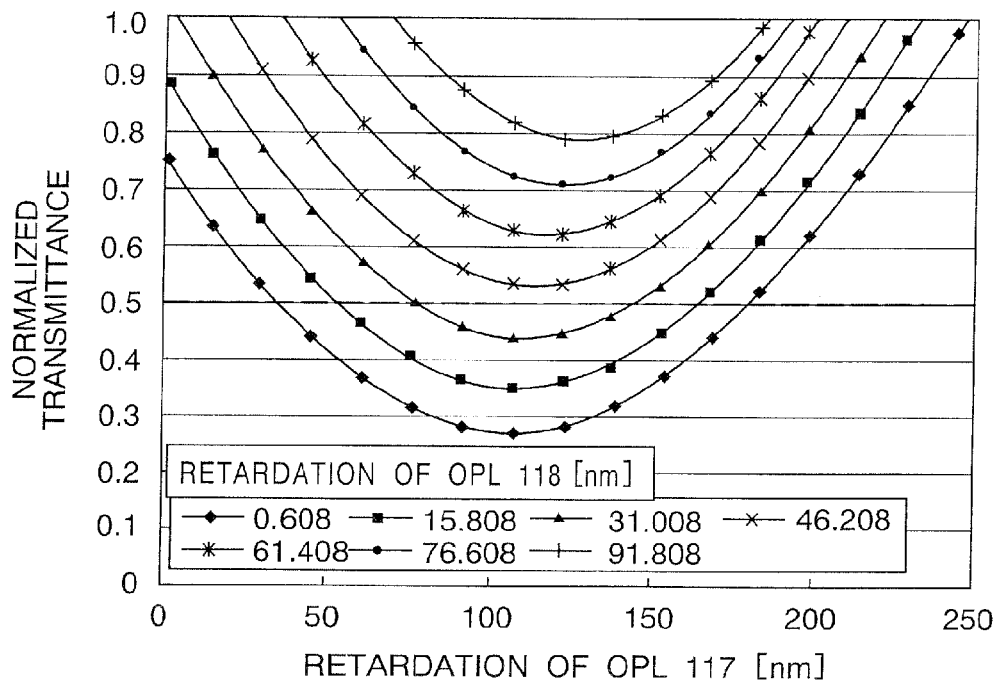
FIG. 9 is a graph showing the relationship between the in-plane retardation of the optical compensation layer on the CF-substrate side and the normalized transmittance in the slanted viewing direction.

FIG. 9 shows the relationship between the retardation of the optical compensation layer 117 on the CF-substrate side and the normalized transmittance of the LCD device in the slanted viewing direction. In FIG. 9, if the retardation of the optical compensation layer 118 on the TFT-substrate side is within a range between 0.6 nm and 46 nm, and the retardation of the optical compensation layer 117 on the CF-substrate side is within a range between 30 nm and 180 nm, the normalized transmittance is 0.5 or above. That is, the combination of these retardations provides a satisfactory level for the leakage light in the slanted viewing direction light upon display of black.

Figure 10:
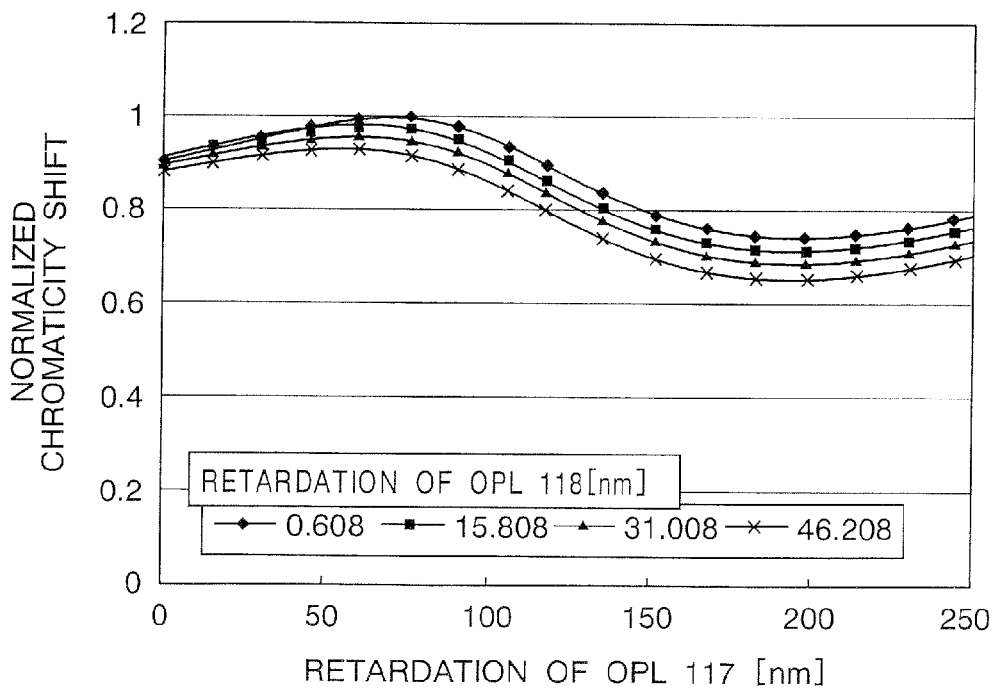
FIG. 10 is a graph showing the relationship between the in-plane retardation of the optical compensation layer on the CF-substrate side and the normalized chromaticity shift in the slanted viewing direction.

FIG. 10 shows the relationship between the in-plane retardation of the optical compensation layer 117 on the CF-substrate side and the normalized chromaticity shift in the slanted viewing direction. In FIG. 10, if the retardation of the optical compensation layer 118 is within a range between 0.6 nm and 45 nm, the normalized chromaticity shift is "1" or lower irrespective of the retardation of the optical compensation layer 117 on the CF-substrate side. In addition, if the optical compensation layer 117 on the CF-substrate side is 150 nm or above, the normalized chromaticity shift is 0.8 or lower, to achieve a more effective suppression of the chromaticity shift.

By using the relationships shown in FIGS. 9 and 10, a combination of the optical compensation layers 117 and 118 can be obtained, which achieves a satisfactory level for the leakage light and effectively suppresses the chromaticity shift. The resultant combination is shown by the dark area in FIG. 11, wherein x and y represent the retardation of the optical compensation layer 118 on the TFT-substrate side, and the retardation of the optical compensation layer 117 on the CF-substrate side. The lower limit and the upper limit of the dark area in FIG. 11 can be approximated by third-order equations of x, and the dark area is defined by the following relationship:

$$29.87+1.79x-0.048x^2+0.001x^3 \leq y \leq 187.22-1.66x+0.0475x^2-0.0009x^3$$

in the range of $0.6 \leq x \leq 46$.

Figure 11:
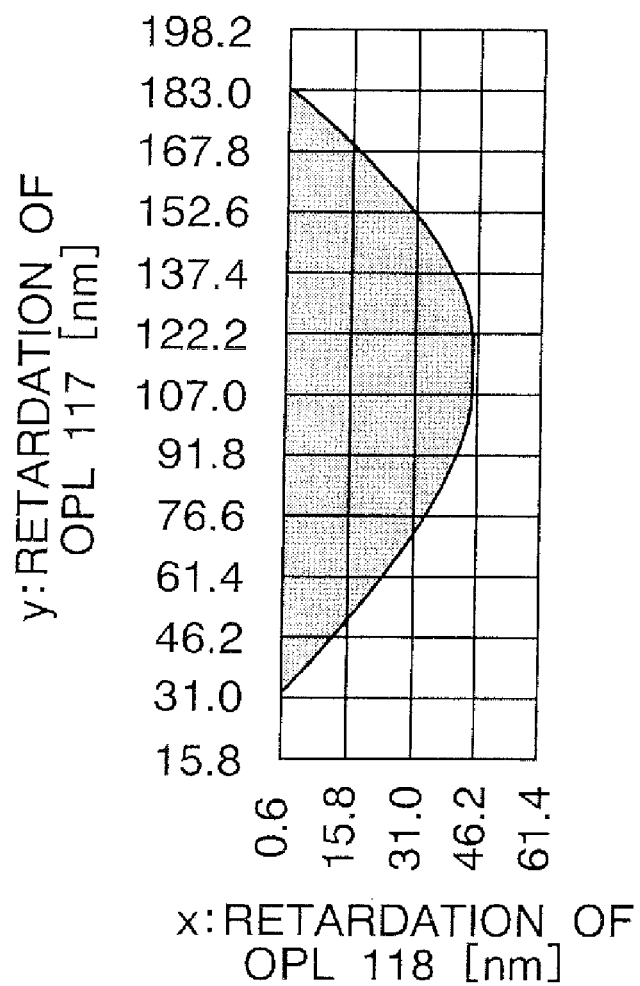
FIG. 11 is a graph showing a range of superior combinations of the retardations of the first optical compensation layer and the second optical compensation layer.

In the present embodiment, by setting the in-plane retardations of the optical compensation layers 117 and 118 within the range shown by the dark area in FIG. 11, satisfactory levels for the leakage light and the chromaticity shift can be obtained. The optical compensation layer 118 may be adhered onto the second protective layer 122, as in the configuration of the present embodiment.

An LCD device according to a third embodiment of the present invention is similar to the LCD device of the second embodiment, except that the angle between the slow axis of the optical compensation layer 118 on the TFT-substrate side and the optical axis of the LC layer 103 is set within a range of ±2 degrees, preferably at zero degree in the present embodiment.

Simulations of the LCD device as to the optical characteristics of the optical compensation layers 117 and 118 including the retardations thereof were conducted for achieving a satisfactory level for the leakage light in the slanted viewing direction and suppressing the chromaticity shift down to the level of the conventional IPS LCD device.

Figure 12:
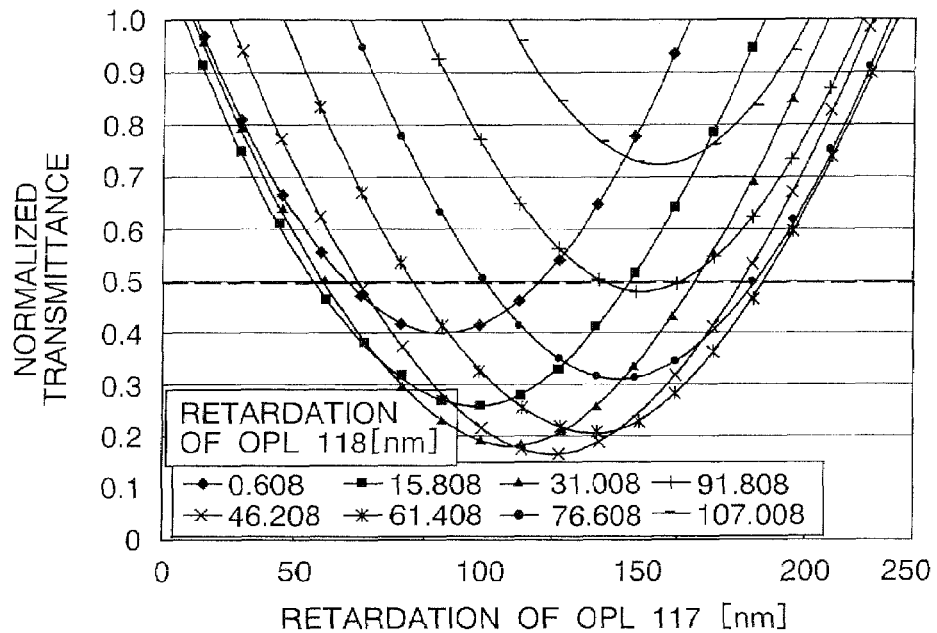
FIG. 12 is graph showing the relationship between the in-plane retardation of the optical compensation layer on the CF-substrate side and the normalized transmittance in the slanted viewing direction.

FIG. 12 shows the relationship between the in-plane retardation of the optical compensation layer 117 on the CF-substrate side and the normalized transmittance in the slanted viewing direction. In FIG. 12, it will be understood that there is a suitable combination of retardations, wherein the retardations of the optical compensation layers 117 and 118 are within ranges between 0.6 nm and 92 nm and between 60 nm and 230 m nm, respectively. This combination provides a normalized transmittance of 0.5 or lower whereby a satisfactory level for the leakage light in the slanted viewing direction is achieved upon display of black.

Figure 13:
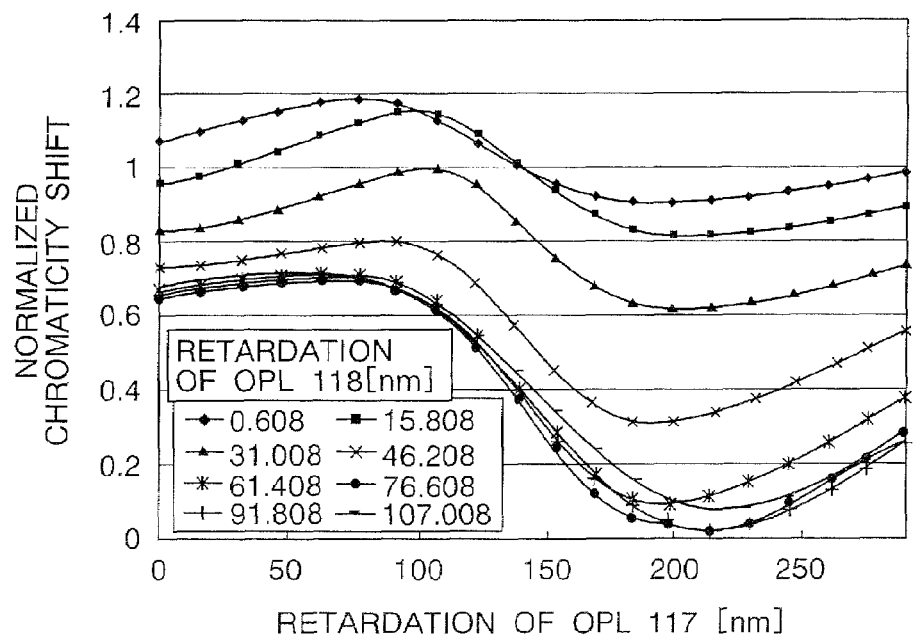
FIG. 13 is a graph showing the relationship between the in-plane retardation of the optical compensation layer on the CF-substrate side and the normalized chromaticity shift in the slanted viewing direction.

FIG. 13 shows the relationship between the in-plane retardation of the optical compensation layer 117 on the CF-substrate side and the normalized chromaticity shift in the slanted viewing direction. In FIG. 13, it will be understood that the normalized chromaticity shift is "1" or lower if the retardation of the optical compensation layer 117 on the CF-substrate side is above about 140 nm for the case where the retardation of the optical compensation layer 118 on the TFT-substrate side is within a range between 0.6 mm and 15 nm. It will be also understood that the normalized chromaticity shift is suppressed down to "1" or lower if the retardation of the optical compensation layer 118 on the TFT-substrate side is about 15 nm or above irrespective of the retardation of the optical compensation layer 117 on the CF-substrate side, and that the normalized chromaticity shift is 0.8 or lower if the retardation of the optical compensation layer 117 on the CF-substrate side is about 150 nm or above.

By using the relationships shown in FIGS. 12 and 13, a combination of the optical compensation layers 117 and 118 can be obtained, which achieves a satisfactory level for the leakage light and effectively suppresses the chromaticity shift. The resultant combination is shown by the dark area in FIG. 14, wherein x and y represent the retardation of the optical compensation layer 118 on the TFT-substrate side, and the retardation of the optical compensation layer 117 on the CF-substrate side, respectively.

Figure 14:
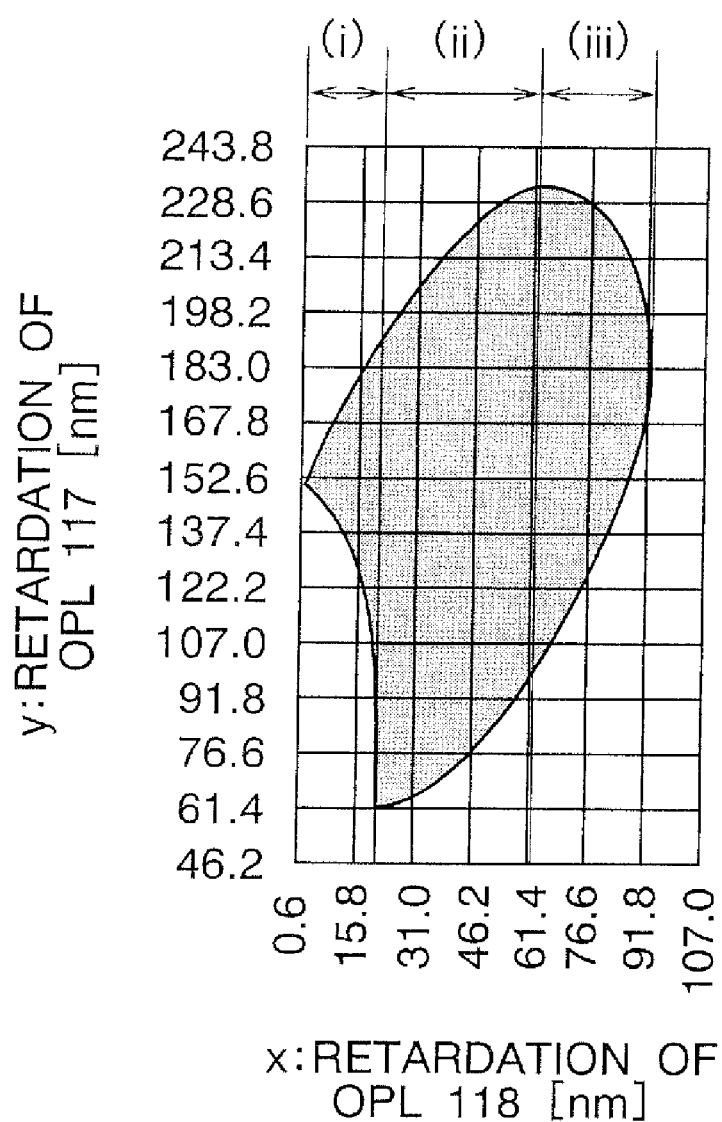
FIG. 14 is a graph showing a range of superior combinations of the retardations of the first optical compensation layer and the second optical compensation layer.

The dark area is divided into three ranges of x for $0.6 \leq x \leq 22$, $22 < x \leq 62$, and $62 \leq 92$, and the lower limit and the upper limit of each range are approximated by two-order to five-order equations for defining the dark area of FIG. 14. The resultant ranges are defined as follows.

(i) in the range of $0.6 \leq x \leq 22$:

$$162.560-8.874x+2.258x^2-0.291x^3+0.0165x^4-0.000346x^5 \leq y \leq 142.465+2.546x-0.017x^2$$

(ii) in the range of $22 < x \leq 62$:

$$73.04-0.977x+0.0220x^2 \leq y \leq 142.465+2.546x-0.017x^2$$

(iii) in the range of $62 < x \leq 92$:

$$73.04-0.977x+0.00220x2 \leq y \leq 1205.596-41.304x+0.586x^{2-0.0028}x^3$$

In the present embodiment, by setting the in-plane retardations of the optical compensation layers 117 and 118 within the range shown by the dark area in FIG. 14, a satisfactory level for the leakage light and suppression of the chromaticity shift can be obtained. It is to be noted that these retardations should be set within the dark area while setting the angle between the slow axis of the optical compensation layer 118 on the TFT-substrate side and the optical axis of the LC layer 103 within ±2 degrees, An IPS LCD device according to a fourth embodiment of the present invention has a configuration similar to that of the LCD device of the second embodiment except that the optical compensation layer 118 has an optical characteristic of:

$$(ns-nz)/(ns-nf) \leq -2$$

in the present embodiment and that the optical compensation layer 118 has an optical axis normal to the substrate surface in the present embodiment. The optical compensation layer 118 has a positive single axis and a retardation of about 0 to 55 nm in the thickness direction thereof. Simulations were conducted to the LCD device of the present embodiment, to obtain a satisfactory level for the leakage light and suppression of the chromaticity shift down to the chromaticity shift of the conventional IPS LCD device having a configuration similar to the LCD device of the present embodiment except for absence of the optical compensation layers 117 and 118.

Figure 15:
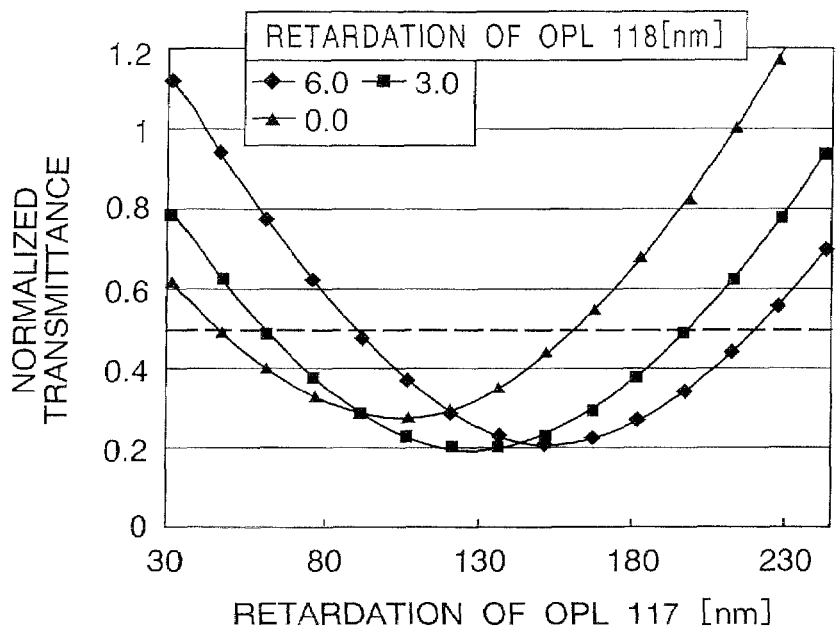
FIG. 15 is a graph showing the relationship between the in-plane retardation of the optical compensation layer on the CF-substrate side and the normalized transmittance in the slanted viewing direction.

FIG. 15 shows the relationship obtained by simulations between the in-plane retardation of the optical compensation layer 117 on the CF-substrate side and the normalized transmittance in the slanted viewing direction. In FIG. 15, it will be understood that there is a combination of retardations, is which achieves a normalized transmittance of 0.5 or lower to obtain a satisfactory level for the leakage light in the slanted viewing direction upon display of black. The combination is such that the retardations of the optical compensation layers 117 and 118 are within ranges between 0 nm and 6.0 nm and between 45 nm and 225 nm, respectively.

Figure 16:
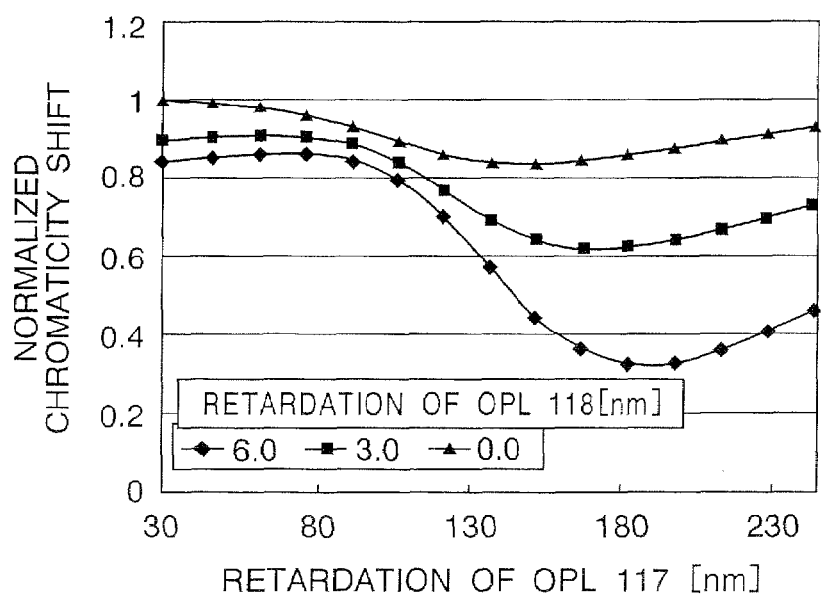
FIG. 16 is a graph showing the relationship between the in-plane retardation of the optical compensation layer on the CF-substrate side and the normalized chromaticity shift in the slanted viewing direction.

FIG. 16 shows the relationship between the in-plane retardation of the optical compensation layer 117 on the CF-substrate side and the normalized chromaticity shift in the slanted viewing direction. In FIG. 16, it will be understood that the normalized chromaticity shift is "1" or lower if the retardation of the optical compensation layer 117 is within a range between 30 nm and 230 nm for the case where the retardation of the optical compensation layer 118 on the TFT-substrate side is within a range between 0 nm and 6.0 nm. It will be also understood that the normalized chromaticity shift is suppressed down to "1" or lower if the retardation of the optical compensation layer 118 on the TFT-substrate side is 3.0 nm and 6.0 nm and the retardation of the optical compensation layer 117 on the CF-substrate side is 130 nm or above.

By using the relationships shown in FIGS. 15 and 16, a combination of the retardations of the optical compensation layers 117 and 118 can be obtained, which achieves a satisfactory level for the leakage light and effectively suppresses the chromaticity shift. The resultant combination is shown by the dark area in FIG. 17, wherein x and y represent the retardation of the optical compensation layer 118 on the TFT-substrate side and the retardation of the optical compensation layer 117 on the CF-substrate side, respectively.

Figure 17:
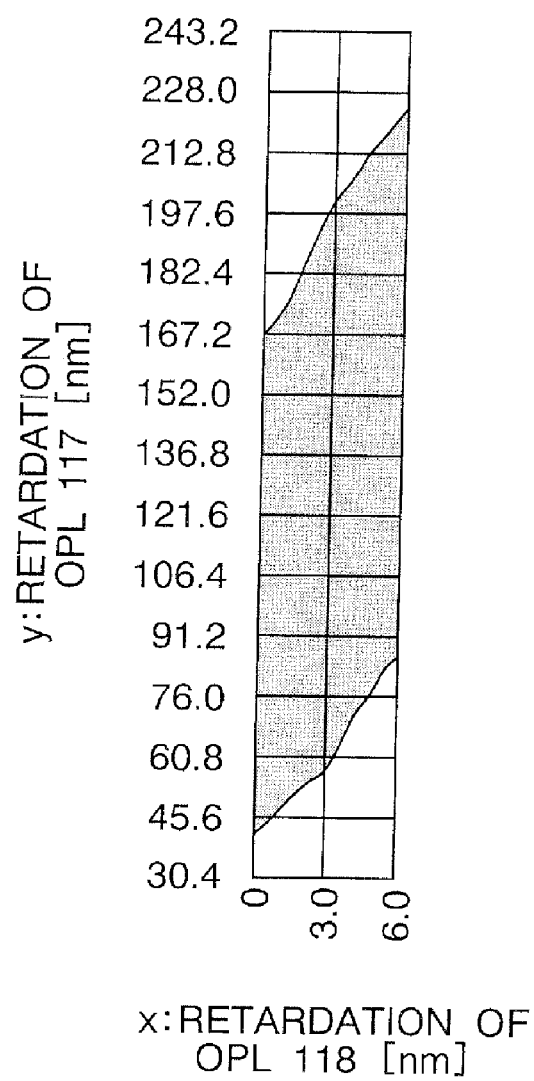
FIG. 17 is a graph showing a range of superior combinations of the retardations of the first optical compensation layer and the second optical compensation layer.

The lower limit and upper limit of the dark area are approximated by linear equations of x for defining the dark area of FIG. 17. The range of combination is defined as follows:

$$36.859+7.617x \leq y \leq 168.193+9.783x$$

in the range of $0 < x \leq 6.0$.

Figure 18A:
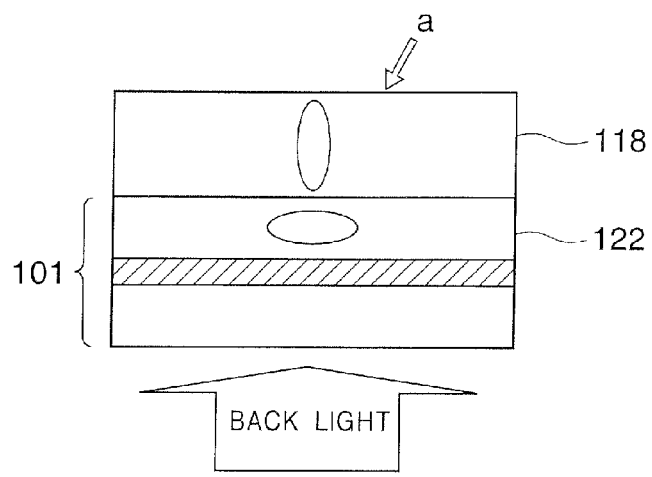
FIG. 18A is a schematic sectional view showing the IPS LCD device of the fourth embodiment.
Figure 18B:
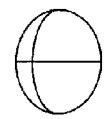
FIGS. 18B to 18D are refractive index ellipses of the optical compensation layer shown in FIG. 18A.
Figure 18C:
Figure 18D:
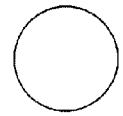
Figure 19:
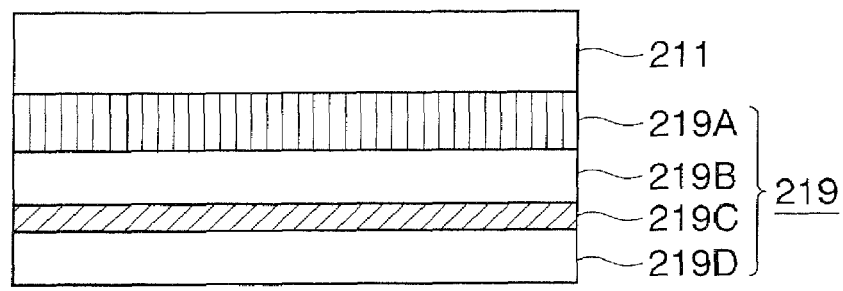
FIG. 19 is a sectional view of a conventional IPS LCD device described in a publication.
Figure 20:
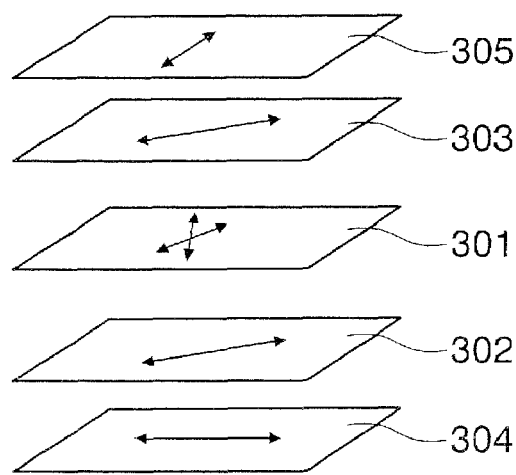
FIG. 20 is an exploded perspective view of another conventional IPS LCD device described in another publication.

FIG. 18A shows a schematic sectional view of an IPS LCD device of the present embodiment, whereas FIGS. 18B to 18D show the principle of the optical compensation effected therein. The optical compensation layer 118 on the TFT substrate 101 can be represented by a refractive-index ellipsoid having a longer axis normal to the substrate surface, whereas the second protective layer 122 of the light-incident-side polarizing film 101 can be expressed by a refractive-index ellipsoid having a longer axis parallel to the substrate surface.

If the optical compensation layer 118 is observed as a separate layer in the slanted viewing direction "a" as shown in FIG. 18A, the refractive index of the optical compensation is layer 118 is observed to be reduced in the lateral direction as shown in FIG. 18B. If the second protective layer 122 is observed as a separate layer in the direction "a", the refractive index of the second protective layer 122 is observed to be extended in the lateral direction, as shown in FIG. 18C. By layering the optical compensation layer 118 and the second protective layer 122 one on another, the refractive index of the second protective layer 122 extended in the lateral direction is compensated by the refractive index of the optical compensation layer 118 reduced in the lateral direction, whereby the total refractive-index ellipsoid is observed to be more likely to a circle, as shown in FIG. 18D.

In the present embodiment, the in-plane retardations of the optical compensation layers 117 and 118 are determined to satisfy the dark area shown in FIG. 17, to obtain a satisfactory level for the leakage light in the slanted viewing direction and suppression of the chromaticity shift. In the first embodiment, the thickness of the second protective layer 122 is reduced to lower the retardation thereof and thus suppress the chromaticity shift, whereas in the present embodiment, the optical compensation layer 118 having a positive single optical axis compensates the retardation of the second protective layer 122 having a negative single optical axis to suppress the chromaticity shift. The latter compensation in the present embodiment corresponds to the compensation achieved by reducing the thickness of the second protective layer 122 in the first embodiment.

An IPS LCD device according to a fifth embodiment of the present invention has a configuration similar to that of the LCD device 100 of the first embodiment shown in FIG. 1. In the present embodiment, the leakage light in the slanted viewing direction is suppressed by a combination of the retardation in the thickness direction of the second protective layer 122 (FIG. 2B) of the light-incident-side polarizing film 101 and the retardation in the thickness direction of the third protective layer 123 (FIG. 2A) of the light-emitting-side polarizing film 105. In the present embodiment, the "thickness d" of the second protective layer 122 of the light-incident-side polarizing film 101 in the first embodiment is replaced by the "retardation" of the second protective layer 122 in the thickness direction. By replacing x representing the "thickness d" of the second protective layer 122 in FIG. 7 by the "retardation x" of the second protective layer 122, a combination of the retardations x and y of the second protective layer 122 and the optical compensation layer 118 can be obtained, which achieves a satisfactory level for the leakage light and suppression of the chromaticity shift. The combination achieving a normalized transmittance of 0.5 is represented by approximating the lower limit and the upper limit of the dark area in FIG. 7 by a linear function of x, to obtain the following relationship:

$$82.813 - 0.900x \leq y \leq 229.604 - 1.214x$$

where 0 nm < x ≤ 55 nm corresponding to 0 μm < d ≤ 80 μm.

Simulations were conducted for the LCD device of FIG. 2 including an optical compensation layer 117 having the retardation "y" in the above formula, to obtain a combination of the retardation of the second protective layer 122 in the thickness direction and the retardation of the third compensation layer 123 in the thickness direction, which achieves a further normalized leakage light of "1" or lower. The further normalized leakage light is defined herein assuming that the minimum normalized transmittance, 0.3, for the case where the second protective layer 122 has a thickness of 80 μm (corresponding to a retardation of 55 nm) assumes "1". These simulations were conducted for the cases where the optical compensation layer 117 has a refractive index satisfying $0.0 \leq (ns-nz)/(ns-nf) < 0.2$, a refractive index satisfying $0.2 \leq (ns-nz)/(ns-nf) < 0.4$ and a refractive index satisfying $0.4 \leq (ns-nz)/(ns-nf) \leq 0.5$. The other parameters used in the simulations are tabulated in Table 3

TABLE 3

| | thickness (μm) | refractive index (or birefringence) | optical axis (φ, θ) |
|---|---|---|---|
| fourth protective layer 124 | 80 | (0.0015) | (0, 90) |
| polarization layer 120 | — | — | (90, 0) |
| glass substrate body 116 | — | 1.54 | — |
| CF substrate 114 | — | 1.5 | — |
| LC layer 103 | — | Δnd = 300 ± 80 nm | — |
| insulation (organic) layer 107 | — | 1.5 | — |
| insulation (SiNx) layer 107 | — | 1.9 | — |
| insulation (SiO$_2$) layer 107 | — | 1.48 | — |
| glass substrate body 106 | — | 1.54 | — |
| polarization layer 120 | — | — | (0, 0) |
| first protective layer 121 | 80 | (0.0015) | (0, 90) |

The retardation $R_{t2}$ (nm) of the second protective layer 122 in the thickness direction is defined by the following relationship:

$$R_{t2} = \left(\frac{npx_2 + npy_2}{2} - npz_2\right) \times d_2$$

where $npx_2$, $npy_2$, $npz_2$ and $d_2$ are the maximum in-plane refractive index, the in-plane refractive index in the direction normal to the direction of the maximum refractive index, the orthogonal refractive index and the thickness, respectively, of the second protective layer 122.

The retardation $R_{t3}$ (nm) of the third protective layer 123 in the thickness direction is defined by the following relationship:

$$R_{t3} = \left(\frac{npx_3 + npy_3}{2} - npz_3\right) \times d_3$$

where $npx_3$, $npy_3$, $npz_3$ and $d_3$ are the maximum in-plane refractive index, the in-plane refractive index in the direction normal to the direction of the maximum refractive index, the orthogonal refractive index and the thickness, respectively, of the third protective layer 123.

The in-plane retardation of the second protective layer 122 is defined by $(npx_2 - npy_2) \times d_2$, whereas the in-plane retardation of the third protective layer 123 is defined by $(npx_3 - npy_3) \times d_3$. In the simulations, the second protective layer 122 and the third protective layer had in-plane retardations equal to or smaller than 10 nm.

Figure 21:
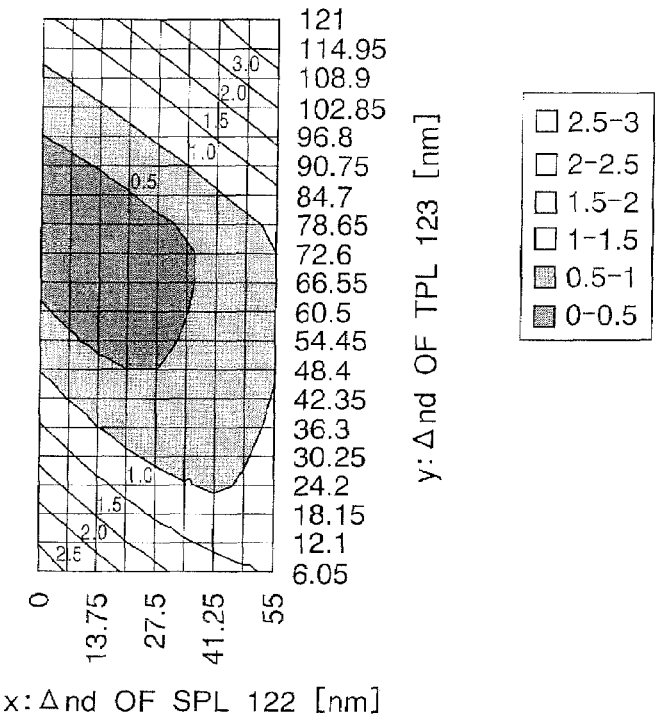
FIG. 21 is a graph showing the relationship between the combination of the retardations of the second protective layer and the third protective layer and the normalized leakage light in the slanted viewing direction, in a specific condition of the refractive index of the optical compensation layer.

FIG. 21 shows the relationship between the normalized leakage light and the combination of the retardations (Δnd) of the second protective layer (SP1) 122 and the third protective layer (TPL) 123 both in the thickness direction for the optical characteristic where the refractive index of the optical compensation layer satisfies $0.0 \leq (ns-nz)/(ns-nf) < 0.2$. The dark area in FIG. 21 provides a combination of the retardations of the second protective layer 122 and the third protective layer 123, which achieves a normalized leakage light of "1" or lower in the slanted viewing direction. The dark area is divided into two ranges of x where $0.0 \leq x < 37.5$ and $37.5 \leq x \leq 55$. The upper limit and the lower limit of "y" in each divided range of the dark area can be approximated by second-order equations of "x", where x and y represent the retardations Rt2 and Rt3, respectively, of the second protective layer 122 and the third protective layer 123. The dark area can be expressed by the following relationships:

(i) in the range of $0.0 \leq x < 37.5$:

$$48.3 - 1.05x + 0.00952x^2 \leq y \leq 111.0 - 0.529x - 0.00472x^2$$

(ii) in the range of $37.5 \leq x \leq 55.0$:

$$34.2 - 16.9x - 0.222x^2 \leq y \leq 111.0 - 0.529x - 0.00472x^2$$

Figure 22:
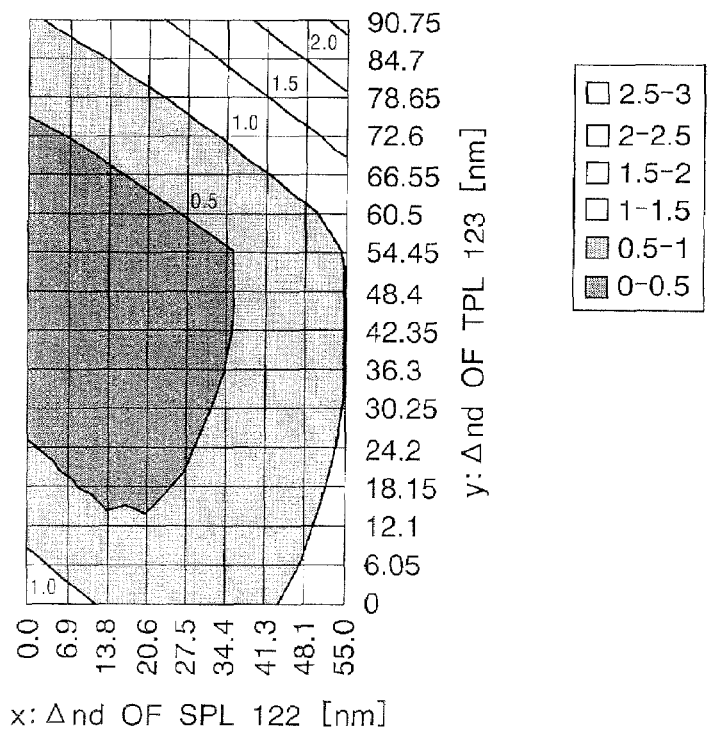
FIG. 22 is a graph showing the relationship between the combination of the retardations of the second protective layer and the third protective and the normalized leakage light in the slanted viewing direction, in another specific condition of the refractive index of the optical compensation layer.

FIG. 22 shows the relationship between the normalized leakage light and the combination of the retardations (Δnd) of the second protective layer (SPL) 122 and the third protective layer (TPL) 123 both in the thickness direction for the optical characteristic where the refractive index of the optical compensation layer 117 satisfies $0.2 \leq (ns-nz)/(ns-nf) < 0.4$. The dark area in FIG. 22 provides a combination of the retardations of the second protective layer 122 and the third protective layer 123, which achieves a normalized leakage light of "1" or lower in the slanted viewing direction. The dark area is divided into three ranges of x where $0.0 \leq x < 10.0$, $10.0 \leq x < 38.0$ and $38.0 < x \leq 55$. The upper limit and the lower limit of "y" in each divided range of the dark area can be approximated by second-order equations of "x" where x and y represent the retardations Rt2 and Rt3, respectively, of the second protective layer 122 and the third protective layer 123. The dark area can be expressed by the following relationships:

(i) in the range of $0.0 \leq x < 10.0$:

$$8.75-0.957x+0.0093x^2 \leq y \leq 90.3-0.368x-0.00832x^2;$$

(ii) in the range of $10.0 \leq x < 38.0$:

$$0 \leq y \leq 90.3-0.368x-000832x^2; \text{ and}$$

(iii) in the range of $38.0 \leq x \leq 55.0$:

$$431.0-22.8x+0.302x^2 \leq y \leq 90.3-0.368x-0.00832x^2.$$

Figure 23:
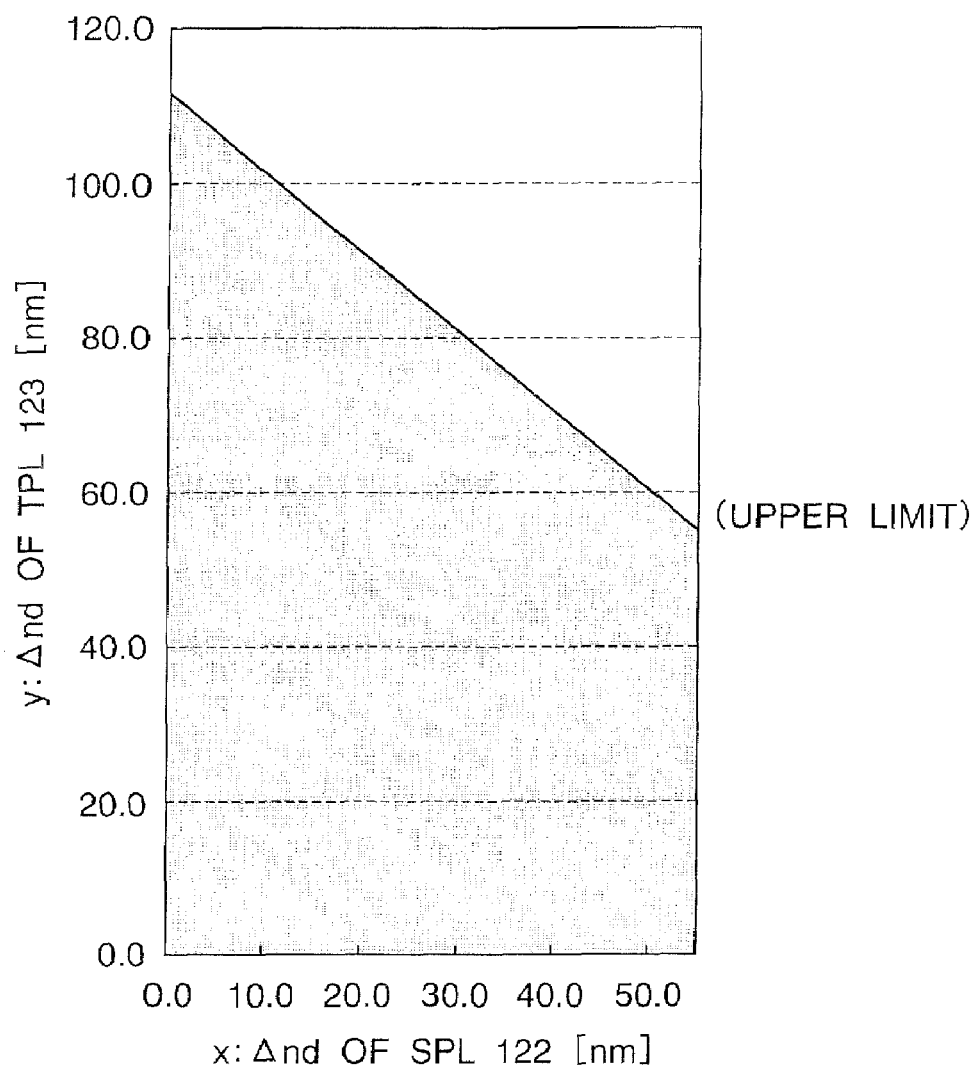
FIG. 23 is a graph showing the relationship between the combination of the retardations of the second protective layer and the third protective and the normalized leakage light in the slanted viewing direction, in another specific condition of the refractive index of the optical compensation layer.

FIG. 23 shows the relationship between the normalized leakage light and the combination of the retardation (x) of the second protective layer 122 and the retardation (y) 0f the third protective layer 123 for the optical compensation layer 117 having an optical characteristic satisfying $0.4 \leq (ns-nz)/(ns-nf) \leq 05$. The dark area in FIG. 23 provides a satisfactory level, 1.0, for the normalized leakage light. By using a similar approximating equation, the dark area in FIG. 23 can be expressed by the following relationship:

$$0 \leq y \leq 65.2-0.805x$$

in the range of $0.0 \leq x \leq 55.0$.

In the present embodiment, by using the combination of the retardations of the second protective layer 122 and the third protective layer 123 both in the thickness direction and satisfying the dark areas shown in FIGS. 21, 22 and 23 for the respective cases of the refractive indexes of the optical compensation layer 117, a satisfactorily low optical dispersion can be obtained at the polarization layer 120 of the light-emitting-side polarizing film 105. Thus, the IPS LCD device of the present embodiment achieves more reduced leakage light in the slanted viewing angle upon display of black compared to the LCD device of the first embodiment. Moreover, if the second protective layer 122 has a retardation within a range of 0 to 25 nm, the normalized leakage light is further reduced down to as low as 0.5 or lower depending on the retardation of the third protective layer 123.

It is to be noted that even the absence of the second protective layer 122 in the present embodiment achieves an advantage similar to that of the case where the second protective layer 122 has a retardation Rt2 of zero.

An IPS LCD device according to a sixth embodiment of the present invention has a configuration similar to that of the LCD device 100 of the first embodiment except for the parameters of the second protective layer 122 and the third protective layer 123. In the simulations of the present embodiment, the third protective layer 123 had an in-plane retardation of 0 to 10 nm, and the second protective layer 122 had an in-plane retardation of 0 to 8 nm. The optical axes of the second protective layer 122 and the third protective layer 123 were normal to the substrate surface. A negative uniaxial retardation film was used as the optical compensation layer 117, having a birefringence wherein no=n1=nz>ne=n2, given n1 and n2 being in-plane refractive indexes in the directions normal to one another. The optical axis of the optical compensation layer 117 was parallel to the light-absorbing axis of the polarization layer 120 (FIG. 2).

A polarizing film pair according to an embodiment of the present invention uses the principle of the polarizing films 105 and 101 shown in FIGS. 2A and 2B. The first polarizing film 105 of the polarizing film pair of the present embodiment includes the protective layer 124, the polarization layer 120, a first retardation film implementing the function of the protective layer 123, and a second retardation film implementing the function of the optical compensation layer 117. The second polarizing film 101 includes the protective layer 121, the polarization layer 120 and a third retardation film 122 implementing the function of the protective layer 122.

Figure 24:
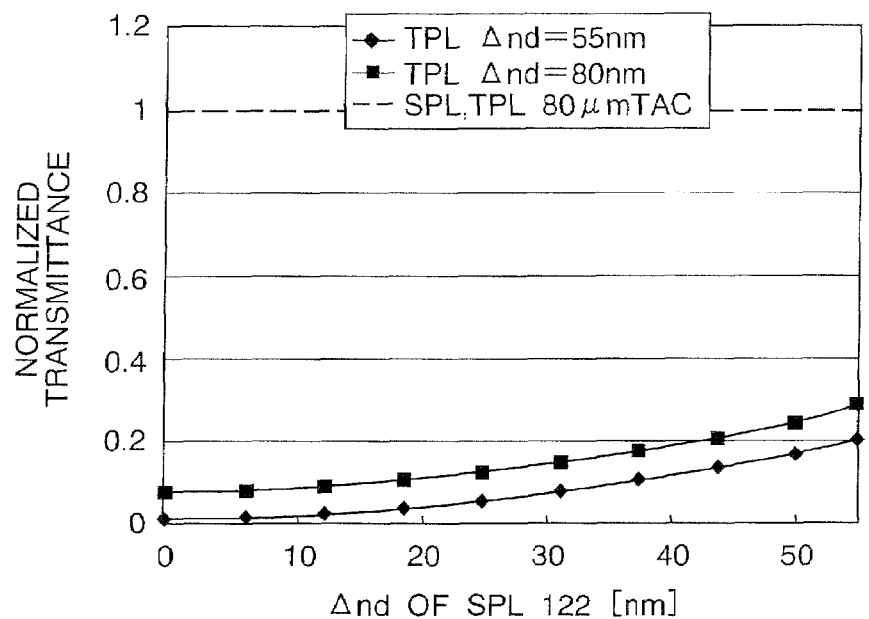
FIG. 24 is a graph showing the relationship between the retardation of the second protective layer in the thickness direction and the normalized leakage light in the slanted viewing direction.

FIG. 24 shows the relationship obtained by the simulations between the retardation of the second protective layer 122 (third retardation film) and the normalized transmittance in the slanted viewing direction. The normalized transmittance in the slanted viewing direction changes as shown in FIG. 24 if the retardation of the second protective layer 122 in the thickness direction is changed between 0 nm and 55 nm, with the retardation of the third protective layer (first retardation film) 123 being fixed at 55 nm and 80 nm. The normalized transmittance, 0.25, for the case where both the retardations of the second and third protective layers 122 and 123 are 55 nm is hereinafter used as a reference "1" as a further normalized transmittance to show the change of the transmittance when the retardation of the third protective layer 123 is changed between 55 nm and 120 nm, with the retardation of the second protective layer 122 being fixed. The resultant further normalized transmittance is shown in FIG. 25.

Figure 25:
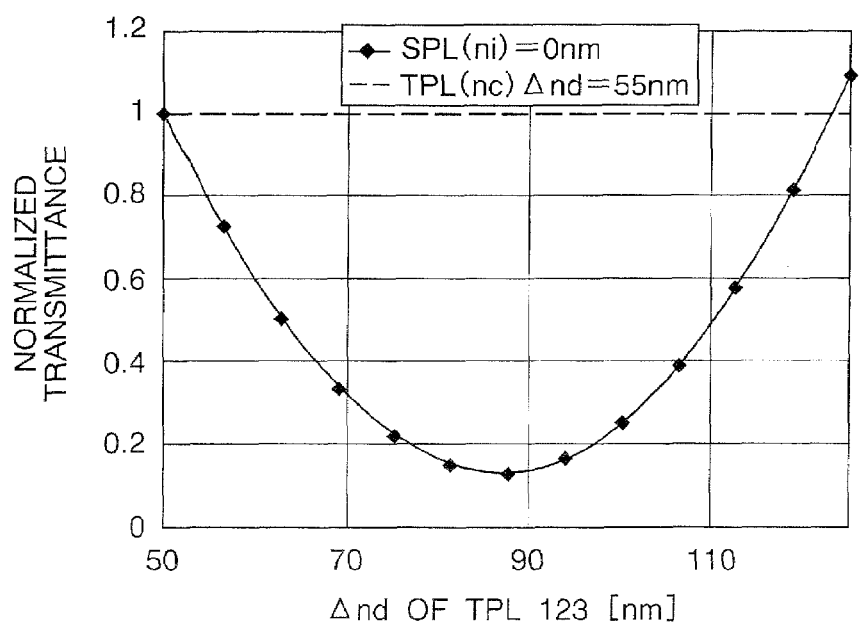
FIG. 25 is a graph showing the relationship between the retardation of the third protective layer in the thickness direction and the normalized leakage light in the slanted viewing direction.

It will be understood from FIG. 25 that the further normalized transmittance upon display of black can be reduced, if the retardation of the third protective layer is set within a range between 55 nm and 123 nm, compared to the case where the retardation of the third protective layer 123 is out of this range. This range of retardation achieves a lower level for the leakage light in the slanted viewing direction upon display of black.

Figure 26:
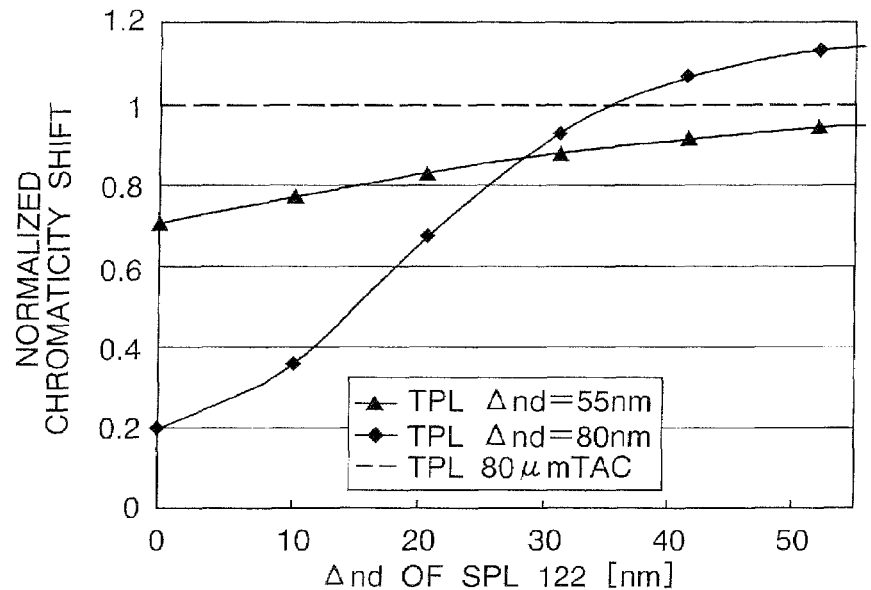
FIG. 26 is a graph showing the relationship between the retardation of the second protective layer in the thickness direction and the normalized chromaticity shift in the slanted viewing direction.

FIG. 26 shows the relationship obtained by the simulations between the normalized chromaticity shift and the retardation of the second protective layer 122. In the simulations, the retardation of the second protective layer 122 is changed between 0 nm and 55 nm with the retardation of the third protective layer 123 being fixed at 55 nm and 80 nm, to obtain the ratio of the chromaticity shift between the normal viewing direction and the slanted viewing direction. The resultant ratio is normalized by the ratio of the chromaticity shift between the normal viewing direction and the slanted viewing direction, which is obtained for the case where LCD device had no optical compensation layer, and the second and third protective layers had a thickness of 80 μm.

Figure 27:
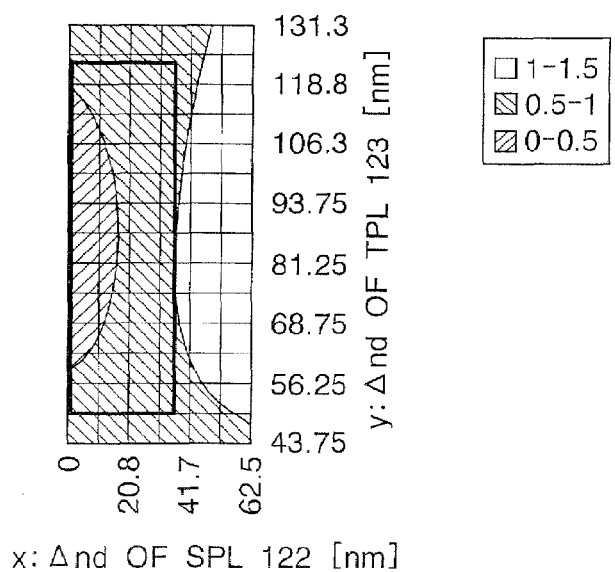
FIG. 27 is a graph showing the relationship between the combination of the retardations of second protective layer and the third protective layer in the thickness direction and the normalized chromaticity shift in the slanted viewing direction.

FIG. 27 shows the relationship between the normalized chromaticity shift and the combination of the retardations of the second protective layer 122 and the third protective layer 123 both in the thickness direction. In FIG. 27, the normalized chromaticity shift is "1" or lower if the second protective layer 122 has a retardation of 0 to 18 nm for the case where retardation of the third protective layer 123 in the thickness direction is in the range of 55 nm and 123 nm, which provides the above satisfactory level for the leakage light.

The dark area of normalized chromaticity shift shown in FIG. 27 is defined hereinafter. The boundary (y) of the dark area of the normalized chromaticity shift between 0.5 or lower and above 0.5 can be expressed by a second-order equation of x, where x and y represent the retardations of the second protective layer 122 and the third protective layer 123, respectively, both in the thickness direction. The dark area can be defined by the following relationship:

$$59.0-0.73x+0.34x^2 \leq y \leq 117.0-0.16x-0.27x^2$$

in the range of $0 < x \leq 17$.

In other word, the range of y defined by the above formula achieves a satisfactory level for the normalized chromaticity shift, 0.5 or lower, thereby effectively suppressing the chromaticity shift in the slanted viewing direction.

Figure 28:
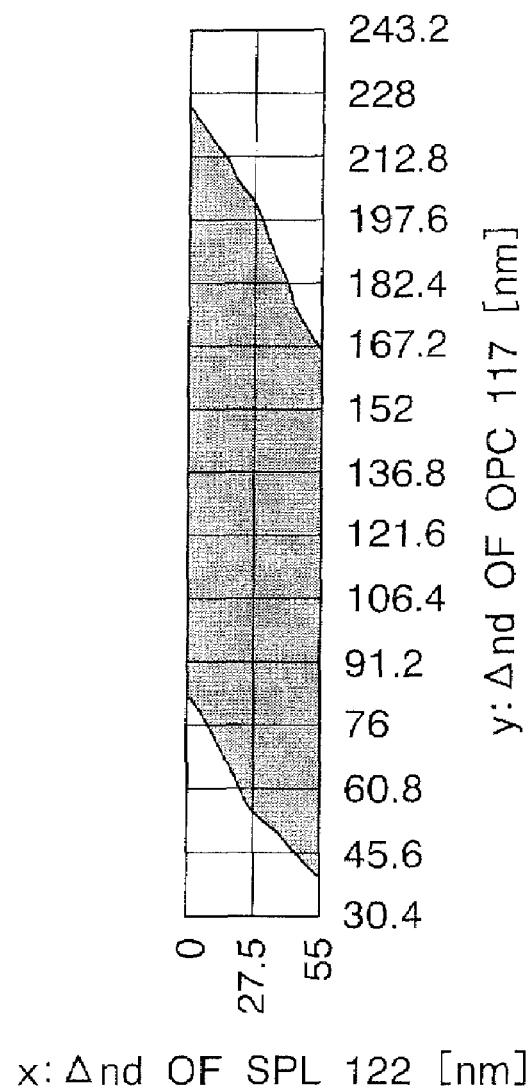
FIG. 28 is a graph showing a range of superior combinations of the retardations of the optical compensation layer and the protective layer and the retardation of the protective layer both in the thickness direction.

It is to be noted that the "thickness d" of the second protective layer 122 shown in FIG. 7 can be replaced by the "retardation" of the second protective layer 122 in the thickness direction, to obtain satisfactory levels for the leakage light and the chromaticity shift in the slanted viewing direction. FIG. 28 shows the satisfactory level for the normalized chromaticity shift obtained by the combination of the retardation of the second protective layer 122 and the retardation of the optical compensation layer 117. As understood from FIG. 28, the satisfactory normalized chromaticity shift can be obtained if the optical compensation layer has a retardation of 83 to 210 nm for the case where the second protective layer 122 has a retardation of 0 to 18 nm.

The principle of the present invention may be preferably applied to an IPS LCD device including polarizing films having a specific haze value on the surfaces thereof, the specific haze value being obtained by a surface treatment for improvement of visibility. Such an LCD device generally has significant leakage light in the slanted direction upon display of black. This causes a problem that the direction of the emitted light in a slanted direction is changed to the normal direction due to the surface treatment, thereby raising brightness upon display of black and degrading the contrast ratio. The present invention suppress the leakage light in the slanted direction upon display of black, thereby reducing the brightness upon display of black and thus improving the contrast ratio in the normal direction in the LCD device. The present invention also reduces the chromaticity shift in the slanted direction. Thus, the LCD device of the present invention may include a variety types of polarizing films, which are treated by a variety of surface treatments.

Since the above embodiments are described only for examples, the present invention is not limited to the above embodiments and various modifications or alterations can be easily made therefrom by those skilled in the art without departing from the scope of the present invention.

For example, the optical compensation layer 117, third protective layer 123, polarization layer 12 and fourth protective layer 124 shown in FIG. 2 may be layered one on another to form an optical compensation and polarizing film.

Further, it is to be noted that the principle of the present invention can be applied to any mode LCD devices, so long as the LC layer has a homogeneous orientation and the LC molecules therein are rotated in a direction parallel to the substrate surface for the change of gray scale levels, similarly to the IPS LCD device.

What is claimed is:

1. An in-plane-switching-mode liquid crystal display (IPS LCD) device comprising:
   a liquid crystal (LC) layer having a first optical axis;
   first and second substrates sandwiching therebetween said LC layer, said first and second substrates being disposed on a light-emitting side and a light-incident side, respectively, of said LCD device;
   first and second polarizing films sandwiching therebetween said first and second substrates and said LC layer, said first and second polarizing films having polarization axes extending normal to each other and being disposed on the light-emitting side and the light-incident side, respectively, of said LCD device, each of said first and second polarizing films including a first protective layer, a polarization layer and a second protective layer, which are disposed consecutively as viewed from the light-incident side, each of said first and second protective layers having a retardation in a thickness direction thereof; and
   an optical compensation layer disposed between said first polarizing film and said first substrate, wherein:
   said optical compensation layer has a birefringence satisfying the relationship $0.0 \leq (ns-nz)/(ns-nf) \leq 0.5$, where ns, nf and nz are a refractive index along an in-plane slow axis, a refractive index along an in-plane fast axis, and a refractive index along a thickness direction, respectively, of said optical compensation layer;
   an angle between said in-plane slow axis of said optical compensation layer and said first optical axis is within ±2 degrees; and
   said optical compensation layer has an in-plane retardation $N_1$ (nm), and said second protective layer of said second polarizing film has a retardation $R_{t2}$:

$$R_{t2} = \left(\frac{npx_2 + npy_2}{2} - npz_2\right) \times d_2$$

in the thickness direction thereof, where $npx_2$, $npy_2$, $npz_2$ and $d_2$ are a refractive index along an in-plane slow axis, a refractive index along an in-plane fast axis, a refractive index along an orthogonal axis and a thickness, respectively, of said second protective layer of said second polarizing film; and said $N_1$ and $R_{t2}$ satisfy therebetween the following relationship:

$$83.050 - 1.18R_{t2} \leq N_1 \leq 228.090 - 1.08R_{t2}$$

in a range of $0 \leq R_{t2} \leq 55$ nm.

2. The IPS LCD device according to claim 1, wherein:
   said birefringence of said optical compensation layer satisfies the relationship $0.0 \leq (ns-nz)/(ns-nf) < 0.2$;
   said first protective layer of said first polarizing film has a retardation $R_{t3}$:

$$R_{t3} = \left(\frac{npx_3 + npy_3}{2} - npz_3\right) \times d_3$$

in the thickness direction thereof, where $npx_3$, $npy_3$, $npz_3$ and $d_3$ are a refractive index along an in-plane slow axis, a refractive index along an in-plane fast axis, a refractive index along a thickness direction and a thickness, respectively, of said first protective layer of said first polarizing film; and said $R_{t2}$ and $R_{t3}$ satisfy therebetween the following relationship:

$$48.3 - 1.05R^{t2} + 0.00952R_{t2}^2 \leq R_{t3} \leq 111.0 - 0.529R_{t2} - 0.00472R_{t2}^2$$

in a range of $0.0 \leq R_{t2} < 37.5$; and $$342.0 - 16.9R^{t2} - 0.222R_{t2}^2 \leq R_{t3} 111.0 - 0.529R_{t2} - 0.00472R_{t2}^2$$

in a range of $37.5 \leq Rt2 \leq 55.0$.

3. The IPS LCD device according to claim 1, wherein:
   said birefringence of said optical compensation layer satisfies the relationship $0.2 \leq (ns-nz)/(ns-nf) \leq 0.4$;
   said first protective layer of said first polarizing film has a retardation $R_{t3}$:

$$R_{t3} = \left(\frac{npx_3 + npy_3}{2} - npz_3\right) \times d_3$$

in the thickness direction thereof, where $npx_3$, $npy_3$, $npz_3$ and $d_3$ are a refractive index along an in-plane slow axis, a refractive index along an in-plane fast axis, a refractive index along an orthogonal axis, and a thickness, respectively, of said first protective layer of said first polarizing film; and said $R_{t2}$ and $R_{t3}$ satisfy the following relationship:

$$8.75 - 0.957 R_{t2} + 0.0093 R_{t2}^2 \leq R_{t3} \leq 90.3 - 0.368 R_{t2} - 0.00832 R_{t2}^2$$

in a range of $0.0 \leq R_{t2} < 10.0$;

$$0 \leq R_{t3} < 90.3 - 0.368 R_{t2} - 0.00832 R_{t2}^2$$

in a range of $10.0 \leq R_{t2} < 38$: and $$431.0 - 22.8 R_{t2} + 0.302 R_{t2}^2 \leq R_{t3} \leq 90.3 - 0.368 R_{t2} - 0.00832 R_{t2}^2$$

in a range of $38.0 \leq R_{t2} \leq 55.0$.

4. The IPS LCD device according to claim 1, wherein:

said birefringence of said optical compensation layer satisfies the relationship $0.4 \leq (ns-nz)/(ns-nf) < 0.5$;

said first protective layer of said first polarizing film has a retardation $R_{t3}$:

$$R_{t3} = \left( \frac{npx_3 + npy_3}{2} - npz_3 \right) \times d_3$$

in the thickness direction thereof, where $npx_3$, $npy_3$, $npz_3$ and $d_3$ are a refractive index along an in-plane slow axis, a refractive index along an in-plane fast axis, a refractive index along a thickness direction and a thickness, respectively, of said first protective layer of said first polarizing film; and said $R_{t2}$ and $R_{t3}$ satisfy the following relationship:

$$0 \leq R_{t3} \leq 65.2 - 0.805 R_{t2}$$

in a range of $0.0 \leq R_{t2} \leq 55.0$.

5. The IPS LCD device according to claim 1, wherein $0 \leq R_{t2} \leq 25$.

6. The IPS LCD device according to claim 1, wherein:

$(npx_2 - npy_2) \times d_2 < 10$; and $(npx_3 - npy_3) \times d_3 \leq 10$.

* * * * *